US012581229B2

(12) United States Patent
Cho et al.

(10) Patent No.: US 12,581,229 B2
(45) Date of Patent: Mar. 17, 2026

(54) ELECTRONIC DEVICE INCLUDING SPEAKER MODULE

(71) Applicant: SAMSUNG ELECTRONICS CO., LTD., Suwon-si (KR)

(72) Inventors: Woojin Cho, Suwon-si (KR); Kiwon Kim, Suwon-si (KR); Myeungseon Kim, Suwon-si (KR); Youngbae Park, Suwon-si (KR); Incheol Baek, Suwon-si (KR); Sunyoung Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 552 days.

(21) Appl. No.: 17/980,940

(22) Filed: Nov. 4, 2022

(65) Prior Publication Data

US 2023/0143417 A1 May 11, 2023

Related U.S. Application Data

(63) Continuation of application No. PCT/KR2022/016450, filed on Oct. 26, 2022.

(30) Foreign Application Priority Data

Nov. 5, 2021 (KR) ........................ 10-2021-0151106

(51) Int. Cl.
*H04R 1/28* (2006.01)

(52) U.S. Cl.
CPC ........... *H04R 1/288* (2013.01); *H04R 1/2857* (2013.01); *H04R 2499/11* (2013.01)

(58) Field of Classification Search
CPC .... H04M 1/026; H04M 1/0202; H04M 1/035; H04R 2499/11; H04R 1/021; H04R 9/045; H04R 1/2811; H04R 1/288; H04R 1/2857
See application file for complete search history.

(56) References Cited

U.S. PATENT DOCUMENTS

| | | | |
|---|---|---|---|
| 7,554,494 B2 | 6/2009 | Kim et al. |
| 7,599,510 B2 | 10/2009 | Ueda et al. |
| 7,743,877 B2 | 6/2010 | Saiki et al. |
| 7,933,123 B2 | 4/2011 | Wang et al. |

(Continued)

FOREIGN PATENT DOCUMENTS

| | | | |
|---|---|---|---|
| CN | 204598285 U * | 8/2015 |
| CN | 108012226 A | 5/2018 |

(Continued)

OTHER PUBLICATIONS

International Search Report (PCT/ISA/210) dated Feb. 20, 2023, issued by International Searching Authority in International Application No. PCT/KR2022/016450.

Communication dated Dec. 3, 2024 issued by the European Patent Office in European Patent Application No. 22890263.1.

*Primary Examiner* — Kile O Blair
(74) *Attorney, Agent, or Firm* — Sughrue Mion, PLLC

(57) ABSTRACT

An electronic device is provided. The electronic device includes: a housing at least partially surrounding a space between a front surface and a rear surface of the electronic device, and including a side structure through which a speaker hole is formed; a speaker configured to emit a sound signal through the speaker hole; a vibration motor structure provided adjacent the speaker, and including a plurality of side surfaces, wherein a motor ventilation hole is formed through a first side surface of the plurality of side surfaces; an enclosure provided in the housing, and surrounding at least a portion of the speaker and at least a portion of the vibration motor structure; a sound absorbing structure provided in the enclosure; and a protection structure provided in the enclosure, and overlapping at least a portion of the motor ventilation hole.

20 Claims, 38 Drawing Sheets

(56) References Cited

U.S. PATENT DOCUMENTS

| | | | |
|---|---|---|---|
| 7,995,334 | B2 | 8/2011 | McClure et al. |
| 8,189,848 | B2 | 5/2012 | Lim |
| 9,769,572 | B2 | 9/2017 | Jiang et al. |
| 9,917,934 | B2 | 3/2018 | Mittleman et al. |
| 10,440,478 | B2 | 10/2019 | Jiang et al. |
| 11,212,619 | B2 | 12/2021 | Jeon et al. |
| 2006/0089184 | A1 | 4/2006 | Kim et al. |
| 2007/0060207 | A1 | 3/2007 | Ueda et al. |
| 2008/0298628 | A1 | 12/2008 | Lim |
| 2009/0120715 | A1 | 5/2009 | Saiki |
| 2013/0237289 | A1 | 9/2013 | Mittleman et al. |
| 2017/0311456 | A1 | 10/2017 | Wang et al. |
| 2020/0274956 | A1 | 8/2020 | Mittleman et al. |
| 2021/0167808 | A1 | 6/2021 | Wang et al. |

FOREIGN PATENT DOCUMENTS

| | | | |
|---|---|---|---|
| CN | 110104990 | A | 8/2019 |
| CN | 214901292 | U | 11/2021 |
| JP | 2010-288045 | A | 12/2010 |
| KR | 10-2002-0085012 | A | 11/2002 |
| KR | 10-2003-0014819 | A | 2/2003 |
| KR | 10-2005-0106446 | A | 11/2005 |
| KR | 10-0678898 | B1 | 2/2007 |
| KR | 10-0860679 | B1 | 9/2008 |
| KR | 10-0890393 | B1 | 3/2009 |
| KR | 10-1907519 | B1 | 10/2018 |
| KR | 10-2020-0104315 | A | 9/2020 |
| WO | 2021/164015 | A1 | 8/2021 |
| WO | 2022/135126 | A1 | 6/2022 |

* cited by examiner

ELECTRONIC DEVICE INCLUDING SPEAKER MODULE

CROSS-REFERENCE TO RELATED APPLICATION(S)

This application is a bypass continuation application of International Application No. PCT/KR2022/016450, filed on Oct. 26, 2022, which is based on and claims priority to Korean Patent Application No. 10-2021-0151106, filed on Nov. 5, 2021, in the Korean Intellectual Property Office, the disclosures of which are incorporated by reference herein in their entireties.

BACKGROUND

1. Field

Embodiments disclosed in the disclosure relate to an electronic device including a speaker module, and a method for forming the same.

2. Description of Relate Art

In recent years, electronic devices, such as smartphone and tablet personal computers (PCs), desktop PCs, portable multimedia players (PMPs), MP3 players, or wearable devices, provide various contents.

As the contents provided by the electronic devices are diversified, the electronic devices need to provide increasingly complex functions.

The number of components accommodated in the interior of the electronic device has increased as the functions of the electronic device provide the increasingly complex functionality. Additionally, the electronic devices have become gradually slimmer to satisfy purchase needs of consumers. Accordingly, it is difficult to sufficiently secure sufficient space for electronic components to be accommodated in the electronic device.

SUMMARY

Provided is an electronic device that may optimize an accommodation space within the electronic device.

In accordance with an aspect of the disclosure, an electronic device includes: a housing at least partially surrounding a space between a front surface and a rear surface of the electronic device, and including a side structure having a speaker hole formed therein; a speaker configured to emit a sound signal through the speaker hole; a vibration motor structure provided adjacent the speaker, and including a plurality of side surfaces, wherein a motor ventilation hole is formed through a first side surface of the plurality of side surfaces; an enclosure provided in the housing, and surrounding at least a portion of the speaker and at least a portion of the vibration motor structure; a sound absorbing structure provided in the enclosure; and a protection structure provided in the enclosure, and overlapping at least a portion of the motor ventilation hole.

The protection structure may be spaced apart from the first side surface by a gap that is smaller than a size of the sound absorbing structure.

The protection structure may be spaced apart from the first side surface by a gap of 0.01 mm to 0.3 mm.

The enclosure may include: a first enclosure; and a second enclosure facing the first enclosure. The speaker and the vibration motor structure may be provided between the first enclosure and the second enclosure.

The protection structure may be integrally formed with the first enclosure, and the protection structure may protrude from the first enclosure toward the second enclosure.

The electronic device may further include a seating structure provided on the first enclosure, and at least partially surrounding the plurality of side surfaces. The protection structure may be spaced apart from the seating structure.

The protection structure may be one among a plurality of protection structures that are spaced apart from each other by a gap that is smaller than a size of the sound absorbing structure.

The protection structure may have a convexo-concave shape that includes a concave area and a convex area, and a width of the concave area may be less than a shortest dimension of the sound absorbing structure.

The enclosure may include: a first enclosure; and a second enclosure facing the first enclosure. The speaker and the vibration motor structure may be provided between the first enclosure and the second enclosure. The protection structure may include: a first portion attached to the first enclosure; and a second portion substantially perpendicular to the first portion, facing the motor ventilation hole, and spaced apart from the motor ventilation hole by a gap that is less than a shortest dimension of the sound absorbing structure.

The protection structure may further include a slit overlapping the motor ventilation hole, and a width of the slit may be less than the shortest dimension.

The electronic device may further include: a first circuit board electrically connected to a speaker provided in the speaker; and a second circuit board connected to a motor provided in the vibration motor structure and the first circuit board. The second circuit board may pass through the motor ventilation hole, and another motor ventilation hole may be formed through a second side surface of the plurality of side surfaces.

The protection structure may be integrally formed with the first circuit board, and may extend toward the motor ventilation hole.

The protection structure may be provided on the first circuit board within 0.3 mm of the first side surface of the vibration motor structure. The protection structure may include any one or any combination of a sponge material, a 2-dimensional or 3-dimensional mesh material, a rubber material, a stainless steel material, or a plastic material.

The electronic device may further include a plurality of adhesives provided between the enclosure and the vibration motor structure, and spaced apart from each other. An auxiliary motor ventilation hole may be formed through a surface of the vibration motor structure which faces the plurality of adhesives. Pipelines between the plurality of adhesives may connect the auxiliary motor ventilation hole, an outer space of the vibration motor structure, and an inner space of the vibration motor structure.

Each of the plurality of adhesives may be narrower than the sound absorbing structure.

In accordance with an aspect of the disclosure, an electronic device includes: a speaker that includes a speaker; an enclosure surrounding at least a portion of the speaker; a vibration motor structure provided adjacent the speaker in the enclosure, wherein a motor ventilation hole is formed through the vibration motor structure to connect a first resonance space formed between the vibration motor structure and the enclosure, and a second resonance space formed within the vibration motor structure; a sound absorbing structure provided in the enclosure; and a protection structure provided in the enclosure, and facing the motor ventilation hole.

The vibration motor structure may include a plurality of side surfaces, the motor ventilation hole may pass through at least any one of the plurality of side surfaces from an inner side to an outer side thereof, and the protection structure may be spaced apart from a side surface of the vibration motor structure, on which the motor ventilation hole is formed, by a gap that is smaller than a size of the sound absorbing structure being interposed therebetween.

The enclosure may include a first enclosure and a second enclosure, which face each other, and the protection structure may protrude from the first enclosure toward the second enclosure.

The enclosure may include: a first enclosure and a second enclosure, which face each other. The protection structure may be attached to the first enclosure. The protection structure may include any one or any combination of a sponge material, a 2-dimensional or 3-dimensional mesh material, a rubber material, a stainless steel material, or a plastic material.

The electronic device may further include: a first circuit board electrically connected to the speaker; and a second circuit board connected to a motor provided in the vibration motor structure and the first circuit board. The protection structure may be integrally formed with the first circuit board or is provided on the first circuit board.

The electronic device may further include a seating structure provided in the enclosure, and at least partially surrounding a side surface of any one or any combination of the vibration motor structure and the speaker. The first resonance space may include: a space between any one or any combination of the first circuit board and the second circuit board, and the enclosure; and a space between the seating structure and the enclosure.

In accordance with an aspect of the disclosure, an electronic device includes: a speaker provided within an enclosure and including a speaker; and a vibration motor structure provided within the enclosure that includes a first surface, a second surface, and a third surface which extends between the first surface and the second surface. A motor ventilation hole is formed through the third surface to allow air provided in the enclosure to flow in and out of the vibration motor structure.

The electronic device may further include a circuit board provided within the motor ventilation hole and electrically connected to a motor provided in the vibration motor structure.

The circuit board may be provided on the first surface and may include a plurality of connection terminals.

The electronic device may further include a protection structure which protrudes from the first surface.

The protection structure may be spaced apart from the third surface along a direction perpendicular to the third surface by a first distance.

The first distance may be greater than 0.01 mm and less than 0.3 mm.

In accordance with an aspect of the disclosure, a method of an electronic device that includes a speaker and a vibration motor structure is provided. The method includes: inducing air to flow through a motor ventilation hole of the vibration motor structure by controlling a speaker provided in the speaker to vibrate according to an audio signal; and controlling a motor provided in the vibration motor structure according to an alert signal.

Provided is an electronic device which may optimize an accommodation space and reduce manufacturing costs as the vibration motor module may be accommodated in an enclosure, in which a speaker module is accommodated.

Provided is an electronic device which may improve a performance of the speaker module as a volume of resonance space is enlarged due to the interior space of the vibration motor module.

Provided is an electronic device which includes a protection structure to prevent a defect of a vibration motor module due to a sound absorbing member blocking a ventilation hole.

Provided is an electronic device which includes a protection structure to prevent deterioration of low-band performance due to a sound absorbing member blocking a ventilation hole.

The disclosure may provide additional effects.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
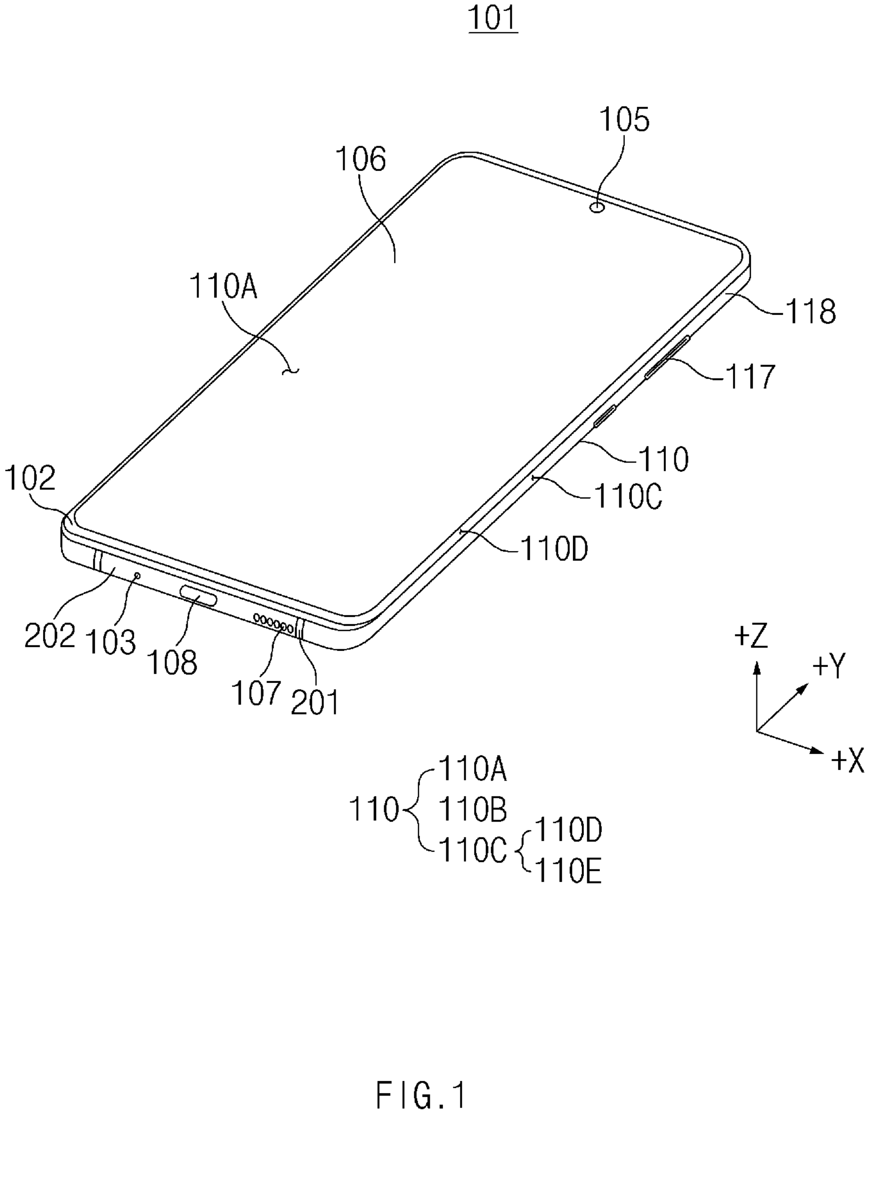
FIG. 1 illustrates a perspective view illustrating a front surface of an electronic device according to various embodiments.

Hereinafter, embodiments will be described with reference to the accompanying drawings. Like reference numerals refer to like elements and a repeated description related thereto will be omitted. As used herein, the terms "1st" or "first" and "2nd" or "second" may use corresponding components regardless of importance or order and are used to distinguish a component from another component without limiting the components. Expressions such as "at least one of" when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c. Those of ordinary skill in the art will recognize that modification, equivalent, and/or alternative on the various embodiments described herein may be variously made without departing from the scope and spirit of the disclosure.

Figure 2:
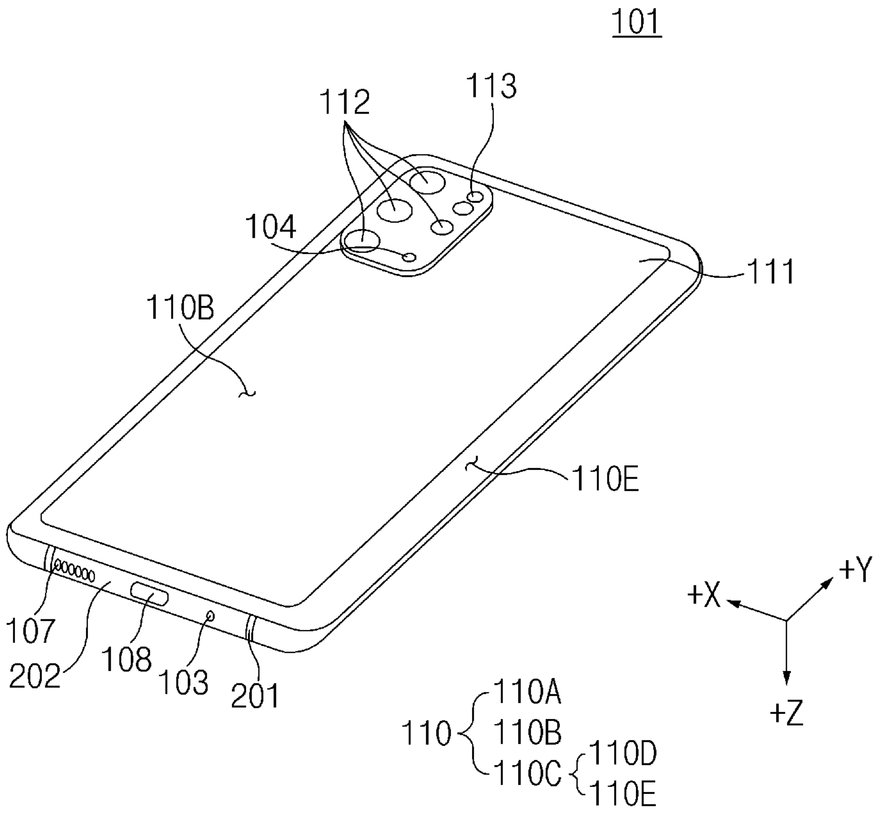
FIG. 2 illustrates a perspective view illustrating a rear surface of an electronic device according to various embodiments.

FIG. 1 is a front perspective view of an electronic device according to an embodiment, and FIG. 2 is a rear perspective view of an electronic device according to an embodiment Referring to FIGS. 1 and 2, an electronic device 101 may include a housing 110 including a first surface (or a front surface) 110A, a second surface (or a rear surface) 110B, and a side surface 110C that encloses a space between the first surface 110A and the second surface 110B.

In another embodiment, the housing 110 may refer to a structure that forms some of the first surface 110A, the second surface 110B, and the side surface 110C.

In one embodiment, the first surface 110A may be formed by a front surface plate 102 (e.g., a glass plate including various coating layers, or a polymer plate) at least a portion of which is substantially transparent. The second surface 110B may be formed by a substantially opaque rear surface plate 111. The rear surface plate 111 may be formed by, for example, coated or colored glass, ceramic, polymer, metal (e.g., aluminum, stainless steel (STS), or magnesium), or a combination of at least two of the above materials. The side surface 110C may be formed by a side surface bezel structure (or a "frame structure") 118 that is coupled to the front surface plate 102 and the rear surface plate 111, and may contain metal and/or polymer.

In another embodiment, the rear surface plate 111 and the side surface bezel structure 118 may be integrally formed and may contain the same material (e.g., a metal material such as aluminum).

As illustrated, the front surface plate 102 may include two first regions 110D bent from a region of the first surface 110A in a direction of the rear surface plate 111 to seamlessly extend. The first regions 110D may be located at ends of long edges of the front surface plate 102, respectively.

As illustrated, the rear surface plate 111 may include two second regions 110E bent from a region of the second surface 110B in a direction of the front surface plate 102 to seamlessly extend. The second regions 110E may be located at ends of long edges of the rear surface plate 111, respectively.

In another embodiment, the front surface plate 102 (or the rear surface plate 111) may include only one of the first regions 110D (or of the second regions 110E). In addition, in another embodiment, the front surface plate 102 (or the rear surface plate 111) may not include some of the first regions 110D (or of the second regions 110E).

In one embodiment, when viewed from the side surface of the electronic device 101, the side surface bezel structure 118 may have a first thickness (or width) in a side surface direction (e.g., a short side) in which the first regions 110D or the second regions 110E as described above are not included, and may have a second thickness smaller than the first thickness in a side surface direction (e.g., a long side) in which the first regions 110D or the second regions 110E are included.

In one embodiment, the electronic device 101 may include at least one of a display 106, an audio module (e.g., speaker module 520 in FIG. 5), a sensor module, camera modules 105, 112, and 113, a key input device 117, a light emitting device, and a connector hole 108. In another embodiment, the electronic device 101 may omit at least one (e.g., the key input device 117 or the light emitting device) of the components or additionally include other components.

In one embodiment, the display 106 may be exposed through a substantial portion of the front surface plate 102. For example, at least a portion of the display 106 may be exposed through the front surface plate 102 including the first surface 110A and the first regions 110D of the side surface 110C.

In one embodiment, an edge of the display 106 may be formed to have a shape that is substantially the same as a shape of an adjacent outer periphery of the front surface plate 102. In another embodiment, a distance between an outer periphery of the display 106 and the outer periphery of the front surface plate 102 may be substantially constant to expand an area to which the display 106 is exposed.

In one embodiment, a surface (or the front surface plate 102) of the housing 110 may include a screen display region defined as the display 106 is visually exposed. For example, the screen display region may include the first surface 110A and the first regions 110D of the side surface.

In another embodiment, the screen display region 110A and 110D may include a sensing region for acquiring biometric information of a user. In this connection, "the screen display region 110A and 110D includes the sensing region" may be understood to mean that at least a portion of the sensing region may overlap the screen display region 110A and 110D. For example, the sensing region may mean a region that may display visual information by the display 106 like other regions of the screen display region 110A and 110D, and additionally acquire the biometric information (e.g., a fingerprint) of the user.

In one embodiment, the screen display region 110A and 110D of the display 106 may include a region in which the first camera module 105 (e.g., a punch hole camera) may be visually exposed. For example, at least a portion of an edge of the region in which the first camera module 105 is exposed may be surrounded by the screen display region 110A and 110D. In one embodiment, the first camera module 105 may include a plurality of camera modules (e.g., the camera module 580 in FIG. 5).

In another embodiment, the display 106 may be coupled to or disposed adjacent to a touch sensing circuit, a pressure sensor capable of measuring an intensity (a pressure) of a touch, and/or a digitizer that detects a magnetic field-type stylus pen.

In one embodiment, the audio module may include the microphone holes 103 and 104 and the speaker hole 107.

In one embodiment, the microphone holes 103 and 104 may include the microphone hole 103 defined in a region of the side surface 110C and the microphone hole 104 defined in a region of the second surface 110B. In the microphone holes 103 and 104, a microphone for acquiring an external sound may be disposed. The microphone may include a plurality of microphones to sense a direction of the sound. In one embodiment, the microphone hole 104 defined in the region of the second surface 110B may be disposed adjacent to the camera modules 105, 112, and 113. For example, the microphone hole 104 may acquire the sound when the camera modules 105, 112, and 113 are executed, or acquire the sound when another function is executed.

In one embodiment, the speaker hole 107 may include the external speaker hole 107 and a receiver hole. The external speaker hole 107 may be defined in a portion of the side surface 110C of the electronic device 101. In another embodiment, the external speaker hole 107 may be implemented as one hole with the microphone hole 103. The receiver hole may be defined in another portion of the side surface 110C. For example, the receiver hole may be defined in another portion (e.g., a portion on a +Y-axis side) of the side surface 110C facing away from the portion (e.g., a portion on a −Y-axis side) of the side surface 110C in which the external speaker hole 107 is defined.

In one embodiment, the electronic device 101 may include a speaker in communication with the speaker hole 107. In another embodiment, the speaker may include a piezo speaker in which the speaker hole 107 is omitted.

In one embodiment, the sensor module may generate an electrical signal or a data value corresponding to an internal operating state or an external environmental state of the electronic device 101. For example, the sensor module may include at least one of a proximity sensor, a HRM sensor, a fingerprint sensor, a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, and an illuminance sensor.

In one embodiment, the camera modules 105, 112, and 113 may include the first camera module 105 (e.g., the punch hole camera) exposed from the first surface 110A of the electronic device 101, and the second camera module 112 and/or the flash 113 exposed through the second surface 110B.

In one embodiment, the first camera module 105 may be exposed through a portion of the screen display region 110A and 110D of the display 106. For example, the first camera module 105 may be exposed from a region of the screen display region 110A and 110D through an opening defined in a portion of the display 106.

In one embodiment, the second camera module 112 may include a plurality of camera modules (e.g., a dual camera, a triple camera, or a quad camera). However, the second camera module 112 may not be necessarily limited to including the plurality of camera modules, and may include one camera module.

Each of the first camera module 105 and the second camera module 112 may include one or a plurality of lenses, an image sensor, and/or an image signal processor. The flash 113 may include, for example, a light emitting diode or a xenon lamp. In another embodiment, two or more lenses (an infrared camera, and wide-angle and telephoto lenses) and image sensors may be disposed on one surface of the electronic device 101.

In one embodiment, the key input device 117 may be disposed on the side surface 110C (e.g., in the first regions 110D and/or the second regions 110E) of the housing 110. In another embodiment, the electronic device 101 may not include a portion or an entirety of the key input device 117, and the key input device 117 that is not included may be implemented in another form, like a soft key, on the display 106. In another embodiment, the key input device may include a sensor module that forms the sensing region included in the screen display region 110A and 110D.

In one embodiment, the connector hole 108 may be configured to receive a connector. The connector hole 108 may be disposed on the side surface 110C of the housing 110. For example, the connector hole 108 may be disposed on the side surface 110C to be adjacent to at least a portion of the audio module (e.g., the microphone hole 103 and the speaker hole 107). In another embodiment, the electronic device 101 may include the first connector hole 108 capable of accommodating a connector (e.g., a universal serial bus (USB) connector) for transmitting/receiving power and/or data with an external device and/or a second connector hole capable of accommodating a connector (e.g., an earphone jack) for transmitting/receiving an audio signal with the external device.

In one embodiment, the electronic device 101 may include the light emitting device. For example, the light emitting device may be disposed on the first surface 110A of the housing 110. The light emitting device may provide state information of the electronic device 101 in a form of light. In another embodiment, the light emitting device may provide a light source that is in association with an operation of the first camera module 105. For example, the light emitting device may include a light emitting diode (LED), an IR LED, and/or a xenon lamp.

In an embodiment, at least a portion of the side surface bezel structure 118 may function as an antenna electrically connected to the communication module. According to an embodiment, the side surface bezel structure 118 may include a conductive part 202 formed of a metal material and a division part 201 formed of an insulating nonmetal material (e.g., a polymer). According to an embodiment, at least a portion of the conductive part 202 may be a radiator, for example, an antenna that is electrically connected to the communication module and is configured to radiate a radio frequency (RF) signal output from the communication module.

Figure 3:
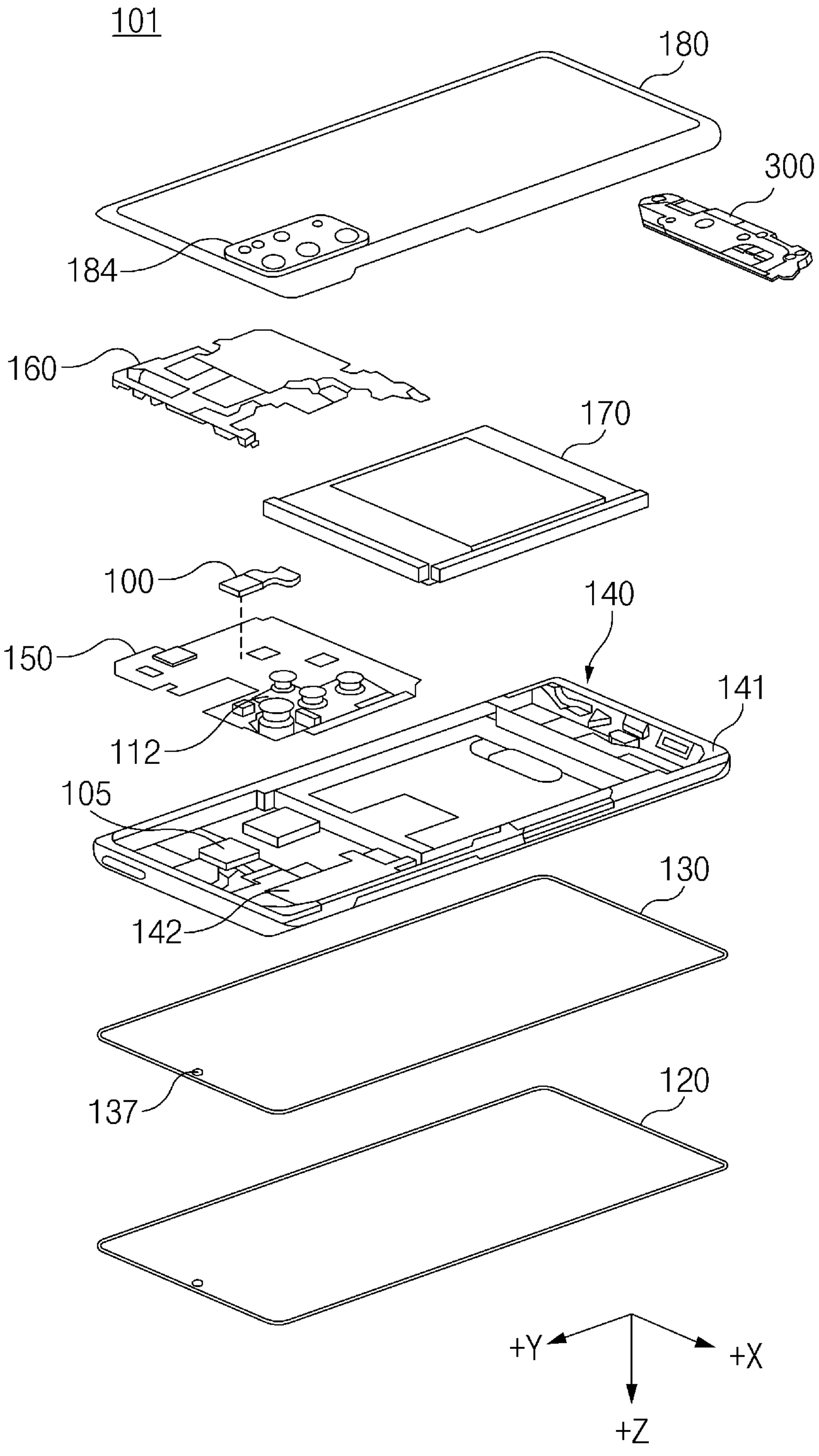
FIG. 3 illustrates an exploded perspective view illustrating an electronic device according to various embodiments.

FIG. 3 is an exploded perspective view of an electronic device according to an embodiment.

Referring to FIG. 3, the electronic device 101 may include a front surface plate 120 (e.g., the front surface plate 102 in FIG. 1), a display 130 (e.g., the display 106 in FIG. 1), a bracket 140, a battery 170, a printed circuit board (PCB) 150, a radio frequency printed circuit board (RFPCB) 100, a support member 160 (e.g., a rear casing), and a rear surface plate 180 (e.g., the rear surface plate 111 in FIG. 2).

In another embodiment, the electronic device 101 may omit at least one (e.g., the support member 160) of the components or additionally include other components. At least one of the components of the electronic device 101 may be the same as or similar to at least one of the components of the electronic device 101 in FIGS. 1 and 2. Hereinafter, redundant descriptions will be omitted.

In one embodiment, at least some of the front surface plate 120, the rear surface plate 180, and the bracket 140 (e.g., a frame structure 141) may form a housing (e.g., the housing 110 in FIGS. 1 and 2).

In one embodiment, the bracket 140 may include the frame structure 141 that forms a surface of the electronic device 101 (e.g., a portion of the side surface 110C in FIG. 1) and a plate structure 142 that extends inward from the frame structure 141.

The plate structure 142 may be located inside the electronic device 101, connected to the frame structure 141, or integrally formed with the frame structure 141. The plate structure 142 may be made of, for example, a metallic material and/or a non-metallic (e.g., polymer) material. The display 130 may be coupled to one surface of the plate structure 142 and the PCB 150 may be coupled to the other surface of the plate structure 142. A processor, a memory, and/or an interface may be mounted on the PCB 150. The processor may include, for example, one or more of a central processing unit, an application processor, a graphics processing device, an image signal processor, a sensor hub processor, and a communication processor.

The memory may include, for example, a volatile memory or a non-volatile memory.

The interface may include, for example, a high definition multimedia interface (HDMI), a USB interface, a Secure Digital (SD) card interface, and/or an audio interface. The interface may, for example, electrically or physically connect the electronic device 101 to the external device, and may include a USB connector, an SD card connector, a MultiMediaCard (MMC) connector, or an audio connector.

In one embodiment, the battery 170 may be configured to supply power to at least one of the components of the electronic device 101. For example, the battery 170 may include a non-rechargeable primary cell, a rechargeable secondary cell, or a fuel cell. In one embodiment, at least a portion of the battery 170 may be disposed substantially coplanar with the PCB 150. In one embodiment, the battery 170 may be integrally disposed inside the electronic device 101 or may be disposed detachably from the electronic device 101.

In one embodiment, the first camera module 105 may be disposed on the plate structure 142 of the bracket 140 such that the lens thereof is exposed from a region of the front surface plate 120 (e.g., the first surface 110A in FIG. 1) of the electronic device 101.

In one embodiment, the first camera module 105 may be disposed such that an optical axis of the lens thereof is at least partially aligned with a hole or recess 137 defined in the display 130. For example, the region from which the lens is exposed may be formed on the front surface plate 120. For example, the first camera module 105 may include the punch hole camera having at least a portion disposed inside the hole or recess 137 defined in a rear surface of the display 130.

In one embodiment, the second camera module 112 may be disposed on the PCB 150 such that the lens thereof is exposed from a camera region 184 of the rear surface plate 180 (e.g., the second surface 110B in FIG. 2) of the electronic device 101.

In one embodiment, the camera region 184 may be formed on a surface (e.g., the second surface 110B in FIG. 2) of the rear surface plate 180. In one embodiment, the camera region 184 may be formed to be at least partially transparent such that external light is incident to the lens of the second camera module 112. In one embodiment, at least a portion of the camera region 184 may protrude from the surface of the rear surface plate 180 with a predetermined height. However, the disclosure may not be necessarily limited thereto, and the camera region 184 may be substantially coplanar with the surface of the rear surface plate 180.

According to an embodiment, the electronic device 101 may include an integral assembly 300 including a speaker module (or speaker) and a vibration motor module disposed in an inner space thereof. A sound signal emitted from the speaker module may be emitted to an outside of the electronic device through a path for delivery of a sound, which is provided in an interior of the electronic device 101. The vibration motor module may generate vibrations in an operation process of the electronic device 101.

The integral assembly 300 may be disposed in a space between the support member 160, and the front surface plate 120 or the rear surface plate 180.

The electronic device 101 according to various embodiments may include an electronic device, such as a bar type, a foldable type, a rollable type, a sliding type, a wearable type, a tablet PC, and/or a notebook PC. The electronic device 101 according to various embodiments of the disclosure is not limited to the above-described example, and may include other various electronic devices.

Figure 4:
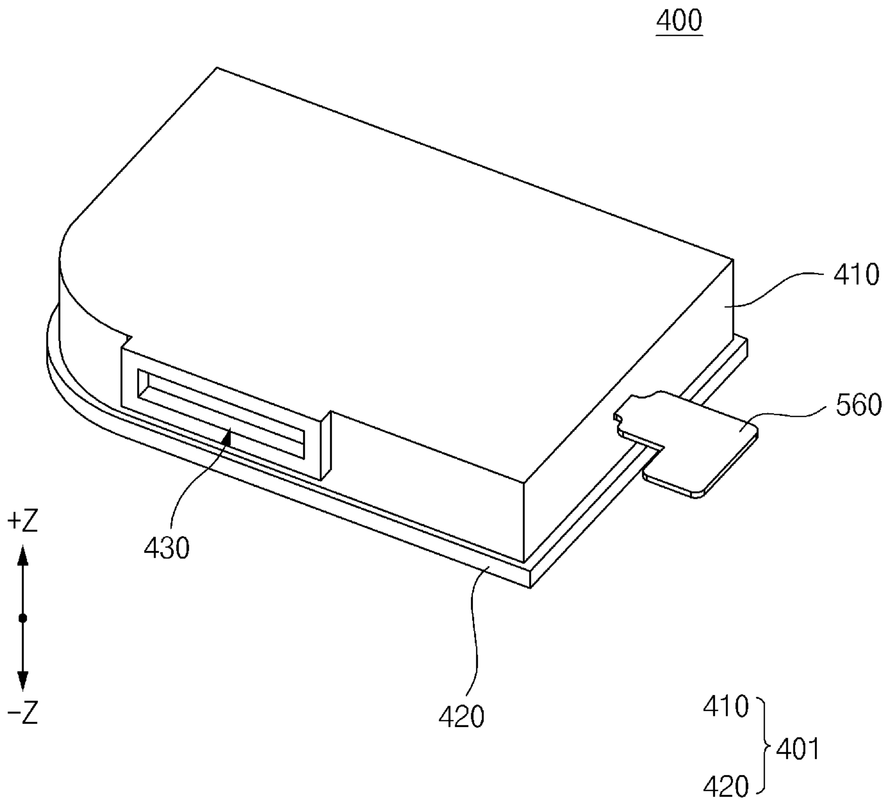
FIG. 4 is a perspective view illustrating an enclosure that accommodates a speaker module and a vibration motor module of an electronic device according to various embodiments.
Figure 5:
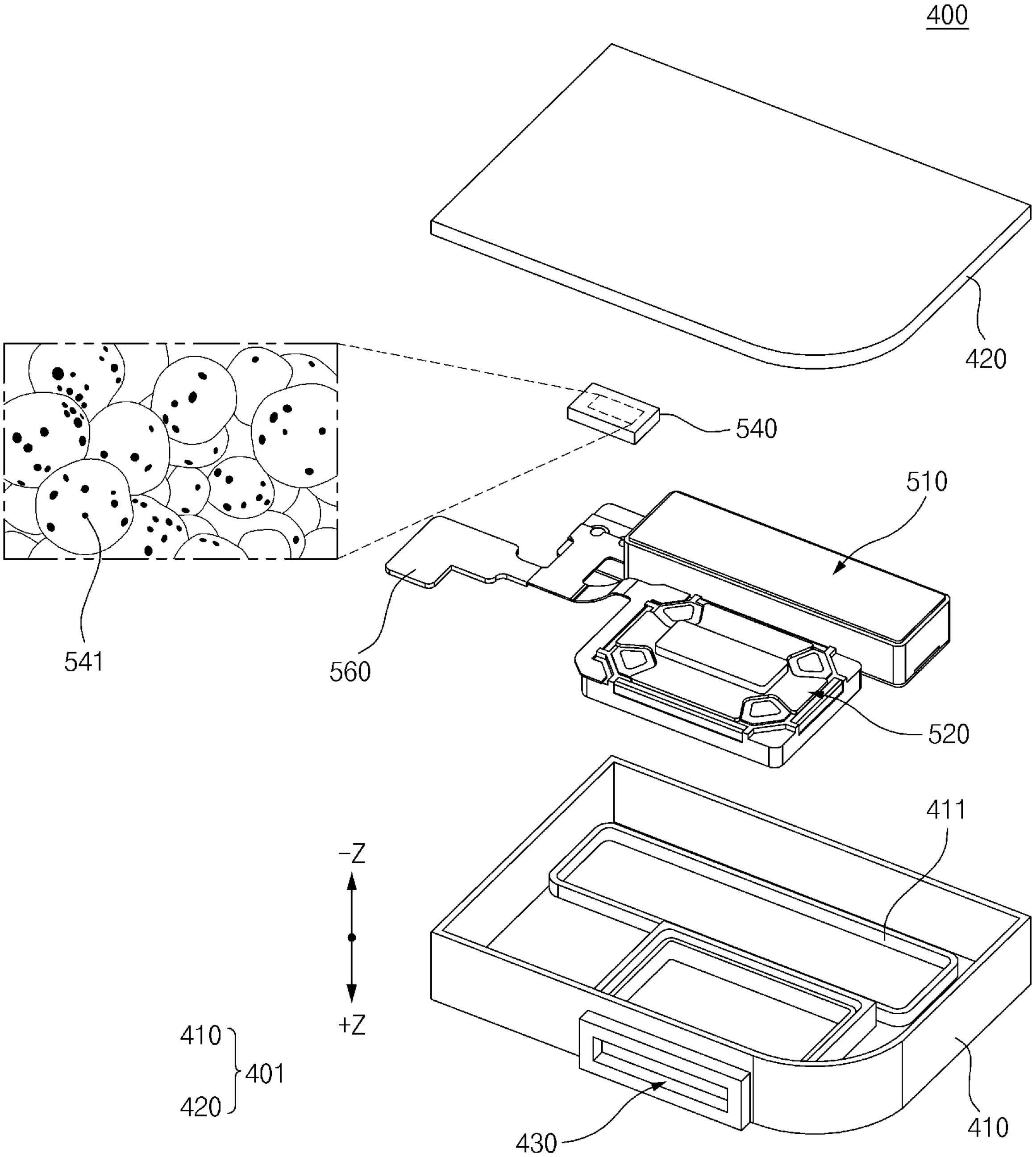
FIG. 5 is an exploded perspective view illustrating an enclosure that includes a speaker module and a vibration motor module of an electronic device according to various embodiments.

FIG. 4 is a perspective view illustrating an enclosure that accommodates a speaker module and a vibration motor module of an electronic device according to various embodiments. FIG. 5 is an exploded perspective view illustrating an enclosure that includes a speaker module and a vibration motor module of an electronic device according to various embodiments.

Referring to FIGS. 4 and 5, an electronic device 400 according to various embodiments may include a speaker module 520, a vibration motor module 510, and an enclosure 401.

The speaker module 520 and the vibration motor module 510 may be formed in one assembly. The speaker module 520 and the vibration motor module 510 may be electrically connected to each other through a first circuit board 560. For example, the first circuit board 560 may be a flexible printed circuit board (FPCB).

According to an embodiment, the speaker module 520 and the vibration motor module 510 may be accommodated in an interior of the enclosure 401. The enclosure 401 may include a first enclosure 410 and a second enclosure 420. Any one of the first enclosure 410 and the second enclosure 420 may face the front plate (e.g., the front surface plate 120 of FIG. 3). The remaining one of the first enclosure 410 and the second enclosure 420 may face the rear plate (e.g., the rear surface plate 180 of FIG. 3). For example, the first enclosure 410 may be disposed in a direction (e.g., the Z axis direction) that faces the front plate, and the second enclosure 420 may be disposed in a direction (e.g., the −Z axis direction) that faces the rear plate.

At least any one of the first enclosure 410 and the second enclosure 420 may be formed of a material, such as a material for injection-molding, stainless steel, or rubber.

According to an embodiment, a space for accommodating the speaker module 520 and the vibration motor module 510 may be formed in the first enclosure 410. The first enclosure 410 may include a seating structure 411 to prevent deviation of the speaker module 520 and the vibration motor module 510. The seating structure 411 may be formed to surround at least a partial area of a side surface of at least any one of the speaker module 520 and the vibration motor module 510. The second enclosure 420 may be coupled to the first enclosure 410, in which the speaker module 520 and the vibration motor module 510 are accommodated. Because the first enclosure 410 and the second enclosure 420 are coupled to each other, a resonance space surrounded by the first enclosure 410 and the second enclosure 420 may be formed.

According to an embodiment, a sound emission hole 430 connected to the speaker hole (e.g., the speaker hole 107 of FIGS. 1 and 2) may be formed on at least one surface of the first enclosure 410. The sound emission hole 430 may guide the sound signal such that the sound signal generated by the speaker module 520 is emitted to an outside. The sound signal generated by the speaker module 520 may be delivered through air included in the resonance space, and the delivered sound signal may be output to an outside through the sound emission hole 430 and the speaker hole.

According to an embodiment, a space for accommodating a sound absorbing member 540 may be formed in at least any one of the first enclosure 410 and the second enclosure 420. The sound absorbing member 540 may be formed of an air suction material 541 in a form of grains. For example, the grains may be larger than 0.01 mm to 0.3 mm. For example, the sound absorbing member 540 may be formed by mixing an air adsorbing material of at least one of a diatomite-based element, pearlite, or a silicon dioxide-based element, or a zeolite-based element, and a binder. The sound absorbing member 540 may alleviate compression of air in the resonance space due to vibrations of the vibration plate disposed in the speaker module 520. The sound absorbing member 540 may absorb air in an interior of the enclosure 401 or discharge the air into an interior of the enclosure 401. According to an embodiment, when a pressure in the interior of the enclosure 401 is increased by the vibrations of the vibration plate disposed in the speaker module 520, the sound absorbing member 540 may absorb the air into the interior of the enclosure 401. When the pressure in the interior of the enclosure 401 is decreased by the vibrations of the vibration plate disposed in the speaker module 520, the air in the interior of the enclosure 401 may be discharged. Due to the sound absorbing member 540, limitations in a magnitude of the vibration plate in the enclosure 401 may be alleviated. Because the same effect as enlargement of a volume (that is, a resonance space) in the enclosure 401 may be obtained by the sound absorbing member 540, a low-band reproduction ability of the speaker module 520 may be enhanced.

FIGS. 6A, 6B, 6C and 6D are views illustrating the speaker module included in the electronic device according to various embodiments.

Referring to FIGS. 6A, 6B, 6C and 6D, the speaker module 520 included in the electronic device according to various embodiments may include speaker components and at least one speaker ventilation hole 620.

The speaker components may include at least one magnet disposed in an inner space of a speaker housing 630, a coil member, and a vibration plate 610.

Figure 6A:
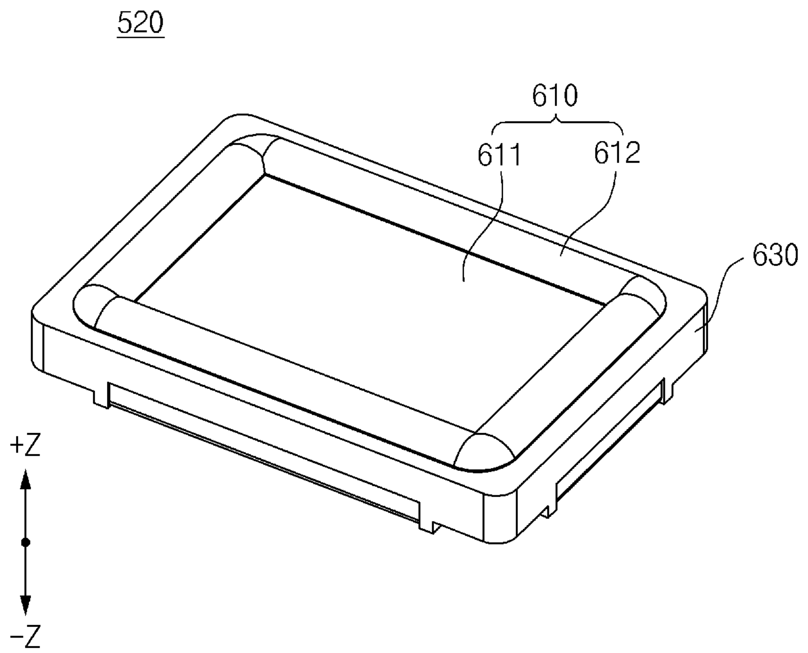
FIGS. 6A, 6B, 6C and 6D are views illustrating a speaker module included in an electronic device according to various embodiments.

The vibration plate 610 may be formed to cover one surface (e.g., a surface that faces the +Z axis) of the speaker housing 630. The vibration plate 610 may include a first vibration plate 611 having a plate shape, and a second vibration plate 612 that surrounds the first vibration plate 611. At least a portion of the second vibration plate 612 may have a curved surface. For example, the first vibration plate 611 and the second vibration plate 612 may have different thicknesses as illustrated in FIG. 6A, or may be formed by joining different materials as illustrated in FIG. 6C.

The vibration plate 610 may vibrate according to movement of at least one coil member disposed in the inner space of the speaker housing 630. The coil member may be disposed at a location, at which it is influenced by a magnetic force of the at least one magnet disposed in the inner space of the speaker housing 630.

The speaker ventilation hole 620 may be used as a path for air flow between an inside and an outside of the speaker module 520. The air outside the speaker module 520 may be introduced into the interior of the speaker module 520 through the speaker ventilation hole 620, and the air in the interior of the speaker module 520 may be discharged to the outside of the speaker module 520 through the speaker ventilation hole 620. A change of the pressure, which is generated when the vibration plate 610 is moved upwards and downwards may be alleviated by the speaker ventilation hole 620.

Figure 6B:
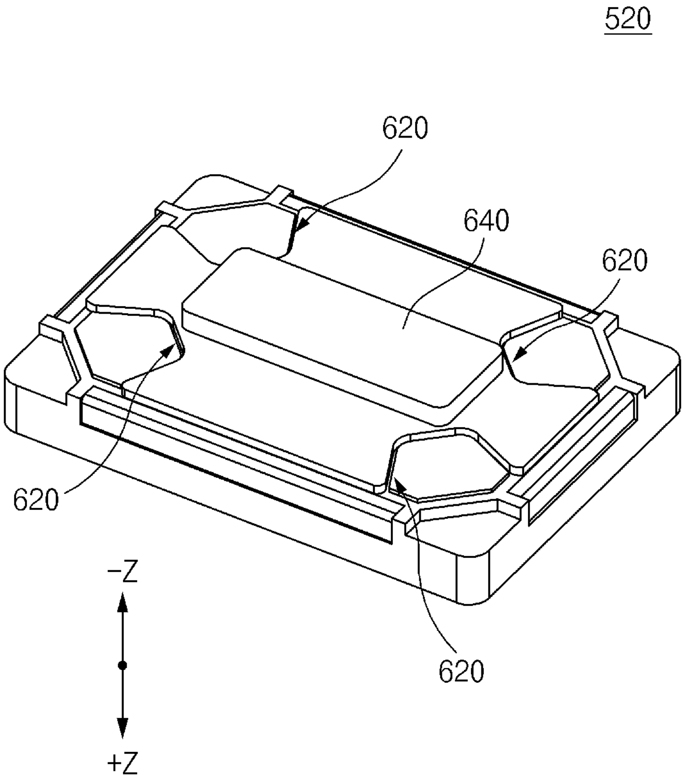
Figure 6C:
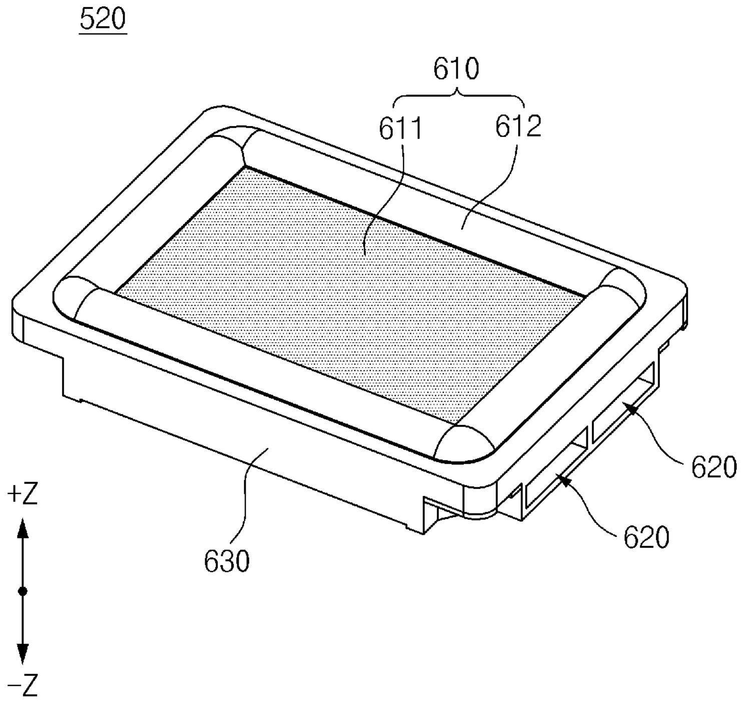
Figure 6D:
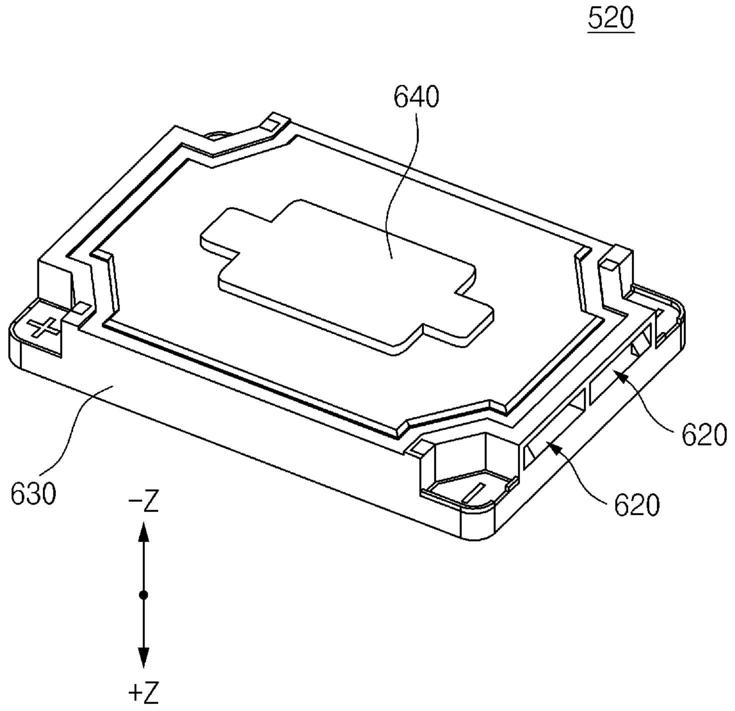

The speaker ventilation hole 620 may be disposed on an opposite surface (a surface that faces the −Z axis) of the speaker housing 630 as illustrated in FIG. 6B, or may be disposed on a side surface of the speaker housing 630 as illustrated in FIG. 6D.

According to an embodiment, the speaker module 520 may include a speaker impact absorbing member 640 disposed on the opposite surface of the speaker housing 630. The speaker impact absorbing member 640 may be disposed between the second enclosure (e.g., the second enclosure 420 of FIG. 5) and the opposite surface of the speaker module 520. The speaker impact absorbing member 640 may prevent interference between the speaker module 520, which is moved due to the vibrations of the vibration plate 610, and the second enclosure. The speaker impact absorbing member 640 may be formed of an elastic material that may absorb an impact. The speaker impact absorbing member 640 may have a polygonal shape as illustrated in FIGS. 6B and 6D. The speaker impact absorbing member 640 is not limited to the shapes illustrated in FIGS. 6B and 6D, and may be implemented in various shapes, which may be interposed between the speaker module 520 and the second enclosure.

Figure 7A:
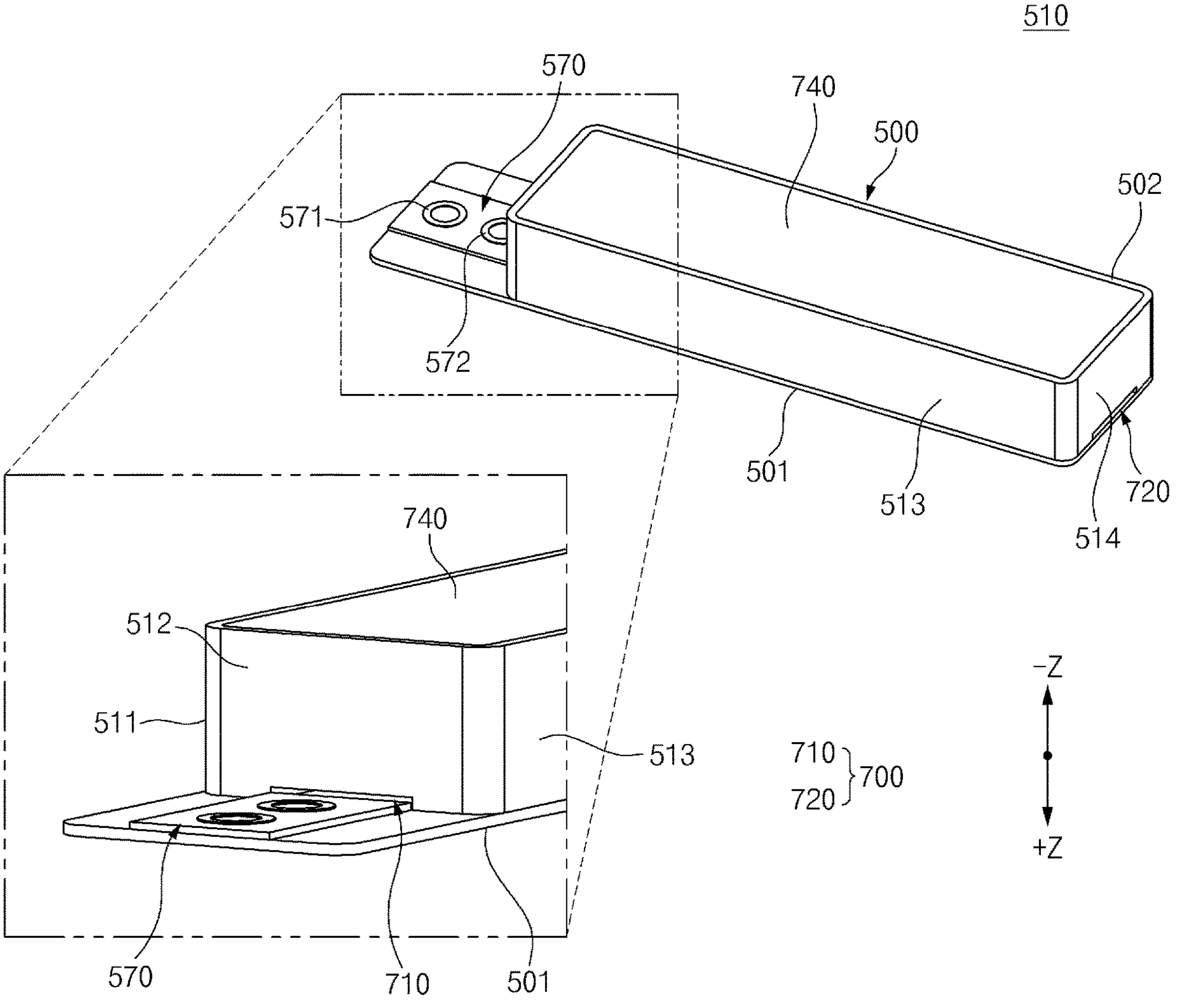
FIG. 7A, 7B and 7C are views illustrating a vibration motor module included in an electronic device according to various embodiments.
Figure 7B:
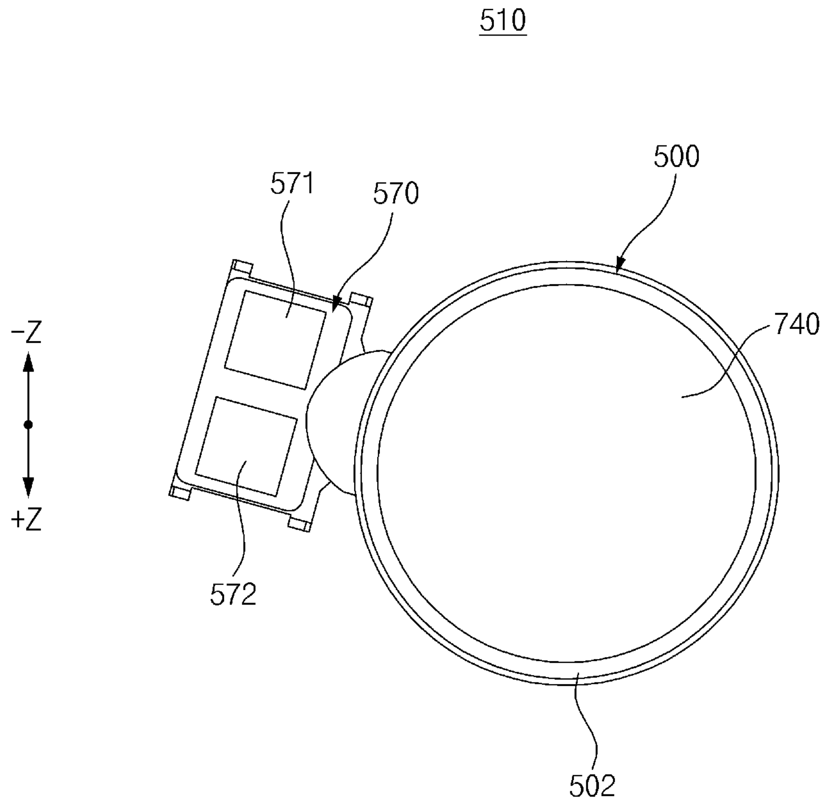
Figure 7C:
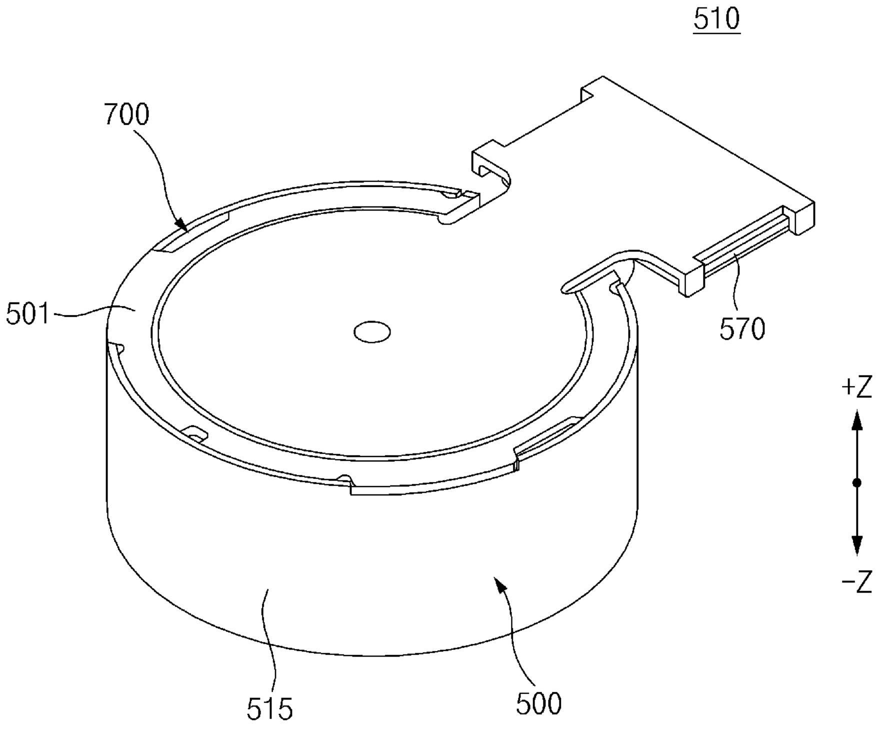

FIGS. 7A, 7B and 7C are views illustrating the vibration motor module included in the electronic device according to various embodiments.

Referring to FIGS. 7A, 7B and 7C, the vibration motor module 510 included in the electronic device according to various embodiments may generate vibrations or a haptic effect by converting an electric signal to mechanical vibrations. The vibration motor module 510 may include a motor housing 500, and vibration motor components disposed in the interior of the motor housing 500. The vibration motor components, for example, may include a motor magnet and a motor coil. The vibration motor module 510 may generate vibrations by using a force that is applied when a current flows according to the Fleming's left-handed law through an electromagnetic field between the motor coil and the motor magnet. Because the motor housing 500 is formed to surround the vibration motor components, the motor housing 500 may define an inner space that surrounds peripheries of the vibration motor components.

The motor housing 500 of the vibration motor module 510 according to an embodiment, as illustrated in FIG. 7A, may have a polyhedral shape. For example, the motor housing 500 may have a substantially hexahedral shape. The motor housing 500 may include a first surface 501, a second surface 502, a first side surface 511, a second side surface 512, a third side surface 513, and a fourth side surface 514. For example, the first side surface 511 may be disposed to face the third side surface 513 in a first direction (e.g., the +X axis direction or the +Y axis direction of FIG. 1). The second side surface 512 may be disposed to face the fourth side surface 514 in a second direction that is perpendicular to the first direction. The first surface 501 may be disposed to face the first enclosure (e.g., the first enclosure 410 of FIGS. 4 and 5), and the second surface 502 may be disposed to face the second enclosure (e.g., the second enclosure 420 of FIGS. 4 and 5). At least any one of the first side surface 511, the second side surface 512, the third side surface 513, and the fourth side surface 514 may extend from any one of the first surface 501 and the second surface 502 and may be integrally formed with the any one of the first surface 501 and the second surface 502. For example, the first side surface 511, the second side surface 512, the third side surface 513, and the fourth side surface 514 may extend from the second surface 502 to the first surface 501 in a direction that is substantially perpendicular to the first surface 501 and be formed. The first side surface 511, the second side surface 512, the third side surface 513, and the fourth side surface 514 may be coupled to the first surface 501 through structural coupling (e.g., press-fitting), by using a mechanism such as a bolt or a nut, or by using a structure such as an adhesive or a tape. At least one motor ventilation hole 700 may be formed on a side surface of at least one of the first side surface 511, the second side surface 512, the third side surface 513, and the fourth side surface 514. The motor ventilation hole 700 may be formed to pass through at least any one of the first side surface 511, the second side surface 512, the third side surface 513, and the fourth side surface 514 from an inner surface to an outer surface thereof.

The motor housing 500 of the vibration motor module 510 according to another embodiment, as illustrated in FIGS. 7B and 7C, may have a cylindrical shape. The motor housing 500 may include the first surface 501, the second surface 502, and a side surface 515. The side surface 515 may extend from the second surface 502 and may be integrally formed with the second surface 502. The side surface 515 may be coupled to the first surface 501 through structural coupling (e.g., press-fitting), by using a mechanism such as a bolt or a nut, or by using a structure such as an adhesive or a tape. At least one motor ventilation hole 700 may be formed on the first surface 501. The motor ventilation hole 700 may be formed to pass through the first surface 501 from an inner side to an outer side thereof. In addition, the motor ventilation hole 700 illustrated in FIGS. 7B and 7C also may be formed on the side surface 515 as well as on the first surface 501.

According to various embodiments, the motor ventilation hole 700 may have a circular shape, an elliptical shape, or a polygonal shape. The motor ventilation hole 700 may connected an inner space of the vibration motor module 510 and an outer space of the vibration motor module 510. Because the air in the outer space of the vibration motor module 510 may be introduced into the inner space of the vibration motor module 510 through the motor ventilation hole 700, a difference of the pressures in the outer space of the vibration motor module 510 and the inner space of the vibration motor module 510 may be eliminated. Accordingly, because the change in the pressure in the interior of the vibration motor module 510 may be alleviated, degradation of a performance of the vibration motor module 510 may be prevented.

According to various embodiments, a second circuit board 570 for transmitting a driving signal to the vibration motor module 510 may be accommodated in at least any one of the motor ventilation hole 700. The motor ventilation hole 700, as illustrated in FIG. 7A, may include a first motor ventilation hole 710 and a second motor ventilation hole 720. The second circuit board 570 may be inserted into the first motor ventilation hole 710. The second circuit board 570 may not be inserted into the second motor ventilation hole 720. The first motor ventilation hole 710 and the second motor ventilation hole 720 may be formed on different side surfaces or the same side surface of the motor housing 500. For example, the first motor ventilation hole 710 may be formed on the second side surface 512 of the motor housing 500, and the second motor ventilation hole 720 may be formed on the fourth side surface 514 that faces the second side surface 512. As another example, the first motor ventilation hole 710 and the second motor ventilation hole 720 may be formed on the same side surface in a multi-stepped structure that is connected upwards and downwards.

According to various embodiments, the second circuit board 570 may include a plurality of signal terminals 571 and 572. For example, the second circuit board 570 may include the first signal terminal 571, to which a positive polarity driving signal is supplied, and the second signal terminal 572, to which a negative polarity driving signal is supplied. The first signal terminal 571 and the second signal terminal 572 may be electrically connected to the first circuit board (e.g., the first circuit board 560 of FIGS. 4 and 5).

According to various embodiments, the second circuit board 570 may be disposed to pass via the first motor ventilation hole 710. A partial area of the second circuit board 570 may be inserted into the interior of the motor housing 500. The remaining area of the second circuit board 570 may be disposed outside the motor housing 500. In this regard, a length of the first motor ventilation hole 710 may be larger than a width of the second circuit board 570 accommodated in the first motor ventilation hole 710, and a width of the first motor ventilation hole 710 may be larger than a thickness of the second circuit board 570.

According to various embodiments, the vibration motor module 510 may include a motor impact absorbing member 740 disposed on the opposite surface (e.g., the −Z axis direction) of the motor housing 500. The motor impact absorbing member 740 may be disposed between the second enclosure (e.g., the second enclosure 420 of FIG. 5) and the opposite surface of the vibration motor module 510. The motor impact absorbing member 740 may prevent interference between the vibration motor module 510, which is moved due to the vibrations of the vibration motor module 510, and the second enclosure. The motor impact absorbing member 740 may be formed of an elastic material that may absorb an impact. The motor impact absorbing member 740, as illustrated in FIGS. 7A and 7B, may have a polygonal shape, a circular shape, or an elliptical shape according to a shape of the opposite surface of the motor housing 500. The motor impact absorbing member 740 is not limited to the shapes illustrated in FIGS. 7A and 7B, and may be implemented in various shapes, which may be interposed between the vibration motor module 510 and the second enclosure.

Figure 8:
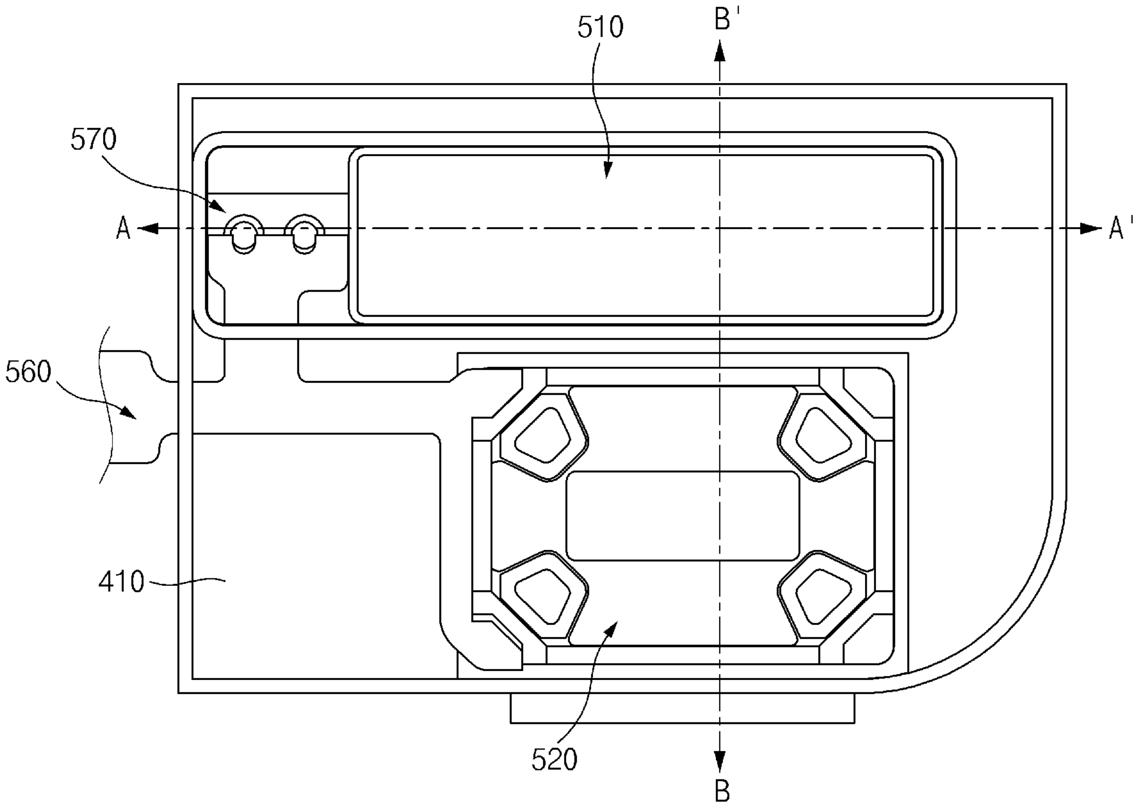
FIG. 8 is a plan view illustrating a speaker module and a vibration motor module seated in a first enclosure of an electronic device according to various embodiments.
Figure 9A:
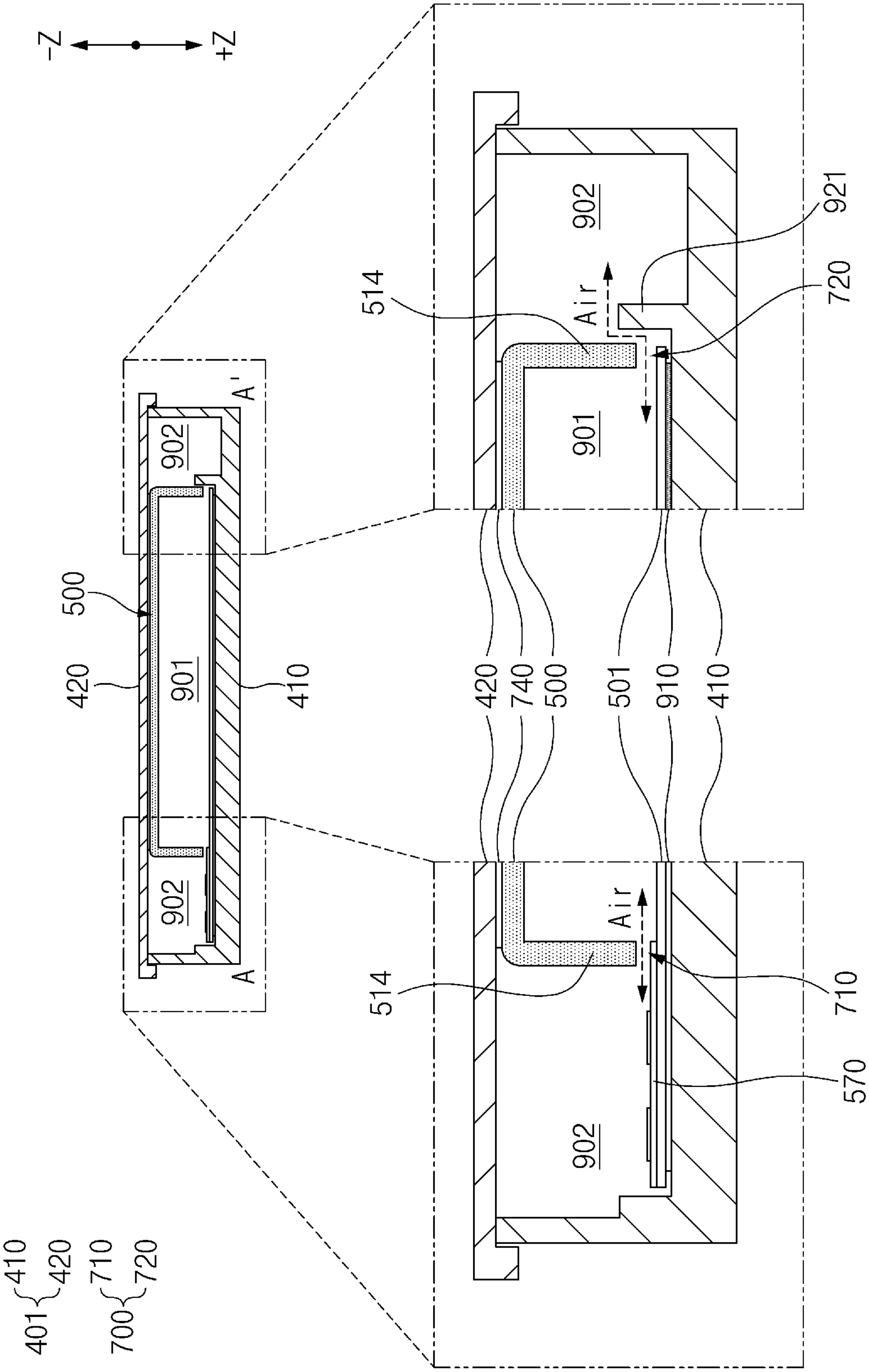
FIG. 9A is a cross-sectional view illustrating a coupling relationship of a first enclosure and a second enclosure, taken along line A-A' of FIG. 8.
Figure 9B:
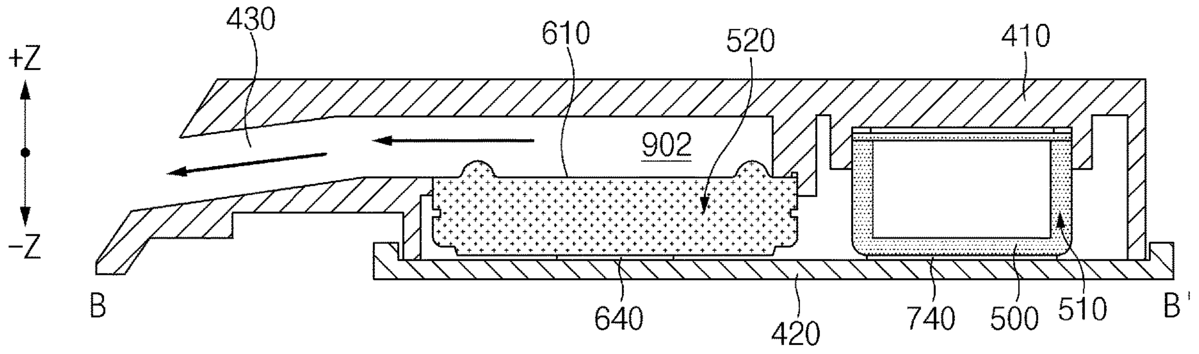
FIG. 9B is a cross-sectional view illustrating a coupling relationship of a first enclosure and a second enclosure, taken along line B-B' of FIG. 8.

FIG. 8 is a plan view illustrating a speaker module and a vibration motor module seated in a first enclosure of an electronic device according to various embodiments. FIG. 9A is a cross-sectional view illustrating a coupling relationship between the first enclosure and the second enclosure, taken along line A-A' of FIG. 8. FIG. 9B is a cross-sectional view illustrating a coupling relationship between the first enclosure and the second enclosure, taken along line B-B' of FIG. 8. In FIGS. 8 to 9B, configurations that are the same as or similar to those of FIGS. 4 to 7 are provided with the same reference numerals, and a description thereof will not be repeated.

Referring to FIGS. 8, 9A and 9B, the vibration motor module 510 disposed in the enclosure 401 of the electronic device according to an embodiment may include the at least one motor ventilation hole 700. An outer space 902 of the vibration motor module 510 disposed in the interior of the enclosure 401 and an inner space 901 of the vibration motor module 510 may be connected to each other through the at least one motor ventilation hole 700. The sound signal generated by the speaker module 520 may be output to an outside through the sound emission hole 430 connected to the outer space (or the first resonance space) 902. For example, the outer space 902 may include a space between at least one of the first circuit board 560 and the second circuit board 570 disposed in the enclosure 401, and the enclosure 401. The outer space 902 may include a space between the seating structure (e.g., the seating structure 411 of FIG. 5) and the enclosure 401. Furthermore, the sound signal generated by the speaker module 520 may be introduced from the outer space 902 of the vibration motor module 510 into the inner space 901 of the vibration motor module 510, through the at least one motor ventilation hole 700. The sound signal introduced into the inner space (or the second resonance space) 901 of the vibration motor module 510 may be delivered through the air contained in the inner space 901, and the delivered sound signal may be output to the outside through the motor ventilation hole 700, the sound emission hole 430, and the speaker hole (e.g., the speaker hole 107 of FIGS. 1 and 2).

In this way, the inner space 901 of the vibration motor module 510 connected to the outer space 902 of the vibration motor module 510 through the at least one motor ventilation hole 700 may be used as the resonance space. Accordingly, because the plurality of resonance spaces 901 and 902 are formed in the enclosure 401 of the limited volume, the total volume of the resonance space may be substantially enlarged. Thus, the performance of the speaker module may be improved.

According to various embodiments, a protection structure 921 may be disposed around the at least one motor ventilation hole 700. The protection structure 921 may overlap the at least one motor ventilation hole 700. The protection structure 921 may be spaced apart from the side surface 514, on which the motor ventilation hole 700 is formed, while a gap that is smaller than a size of the sound absorbing member (e.g., the sound absorbing member 540 of FIG. 5) or the air suction material (e.g., the air suction material 541 of FIG. 5) or may contact the side surface 514, on which the motor ventilation hole 700. As an example, when the protection structure 921 is formed of a material with no ventilation property, it may be disposed to be spaced apart from the side surface 514, on which the motor ventilation hole 700 is formed. As another example, when the protection structure 921 is formed of a material with a ventilation property, the protection structure 921 may be disposed to contact or be spaced apart from the side surface 514, on which the motor ventilation hole 700 is formed. The protection structure 921 may block the sound absorbing member and the air suction material from passing through the motor ventilation hole 700. Accordingly, a defect caused as the motor ventilation hole 700 is blocked by the sound absorbing member may be prevented, and the sound absorbing member may be prevented from being introduced into the second resonance space, that is the inner space 901 of the motor housing 500, through the motor ventilation hole 700.

According to various embodiments, an adhesive member 910 may be disposed between the first enclosure 410 and the first surface 501 of the motor housing 500. The adhesive member 910 may be an adhesive tape, poron, or a bonding adhesive.

Figure 10A:
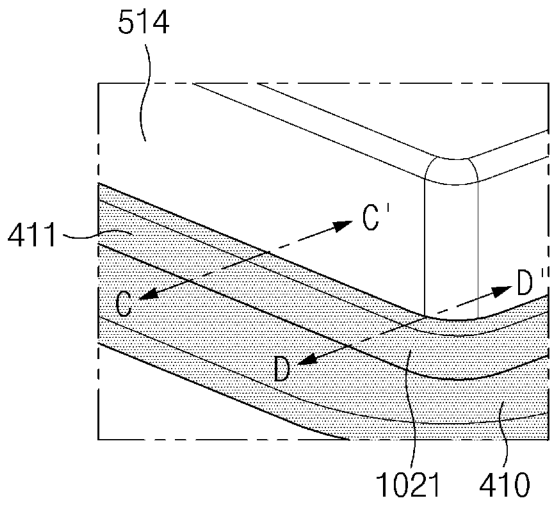
FIGS. 10A, 10B, 10C, 10D and 10E are views illustrating a protection structure applied to a second motor ventilation hole of an electronic device according to various embodiments.
Figure 10B:
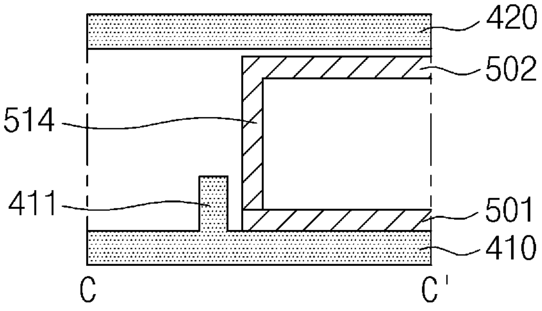
Figure 10C:
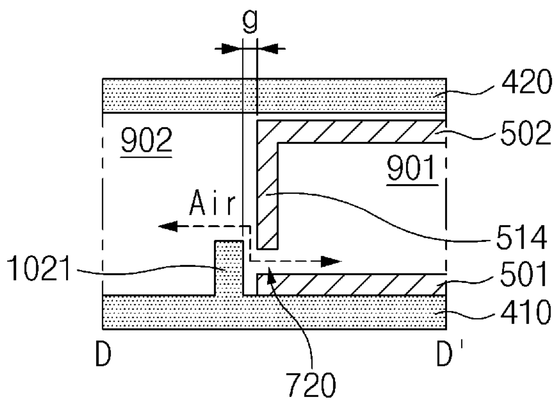
Figure 10D:
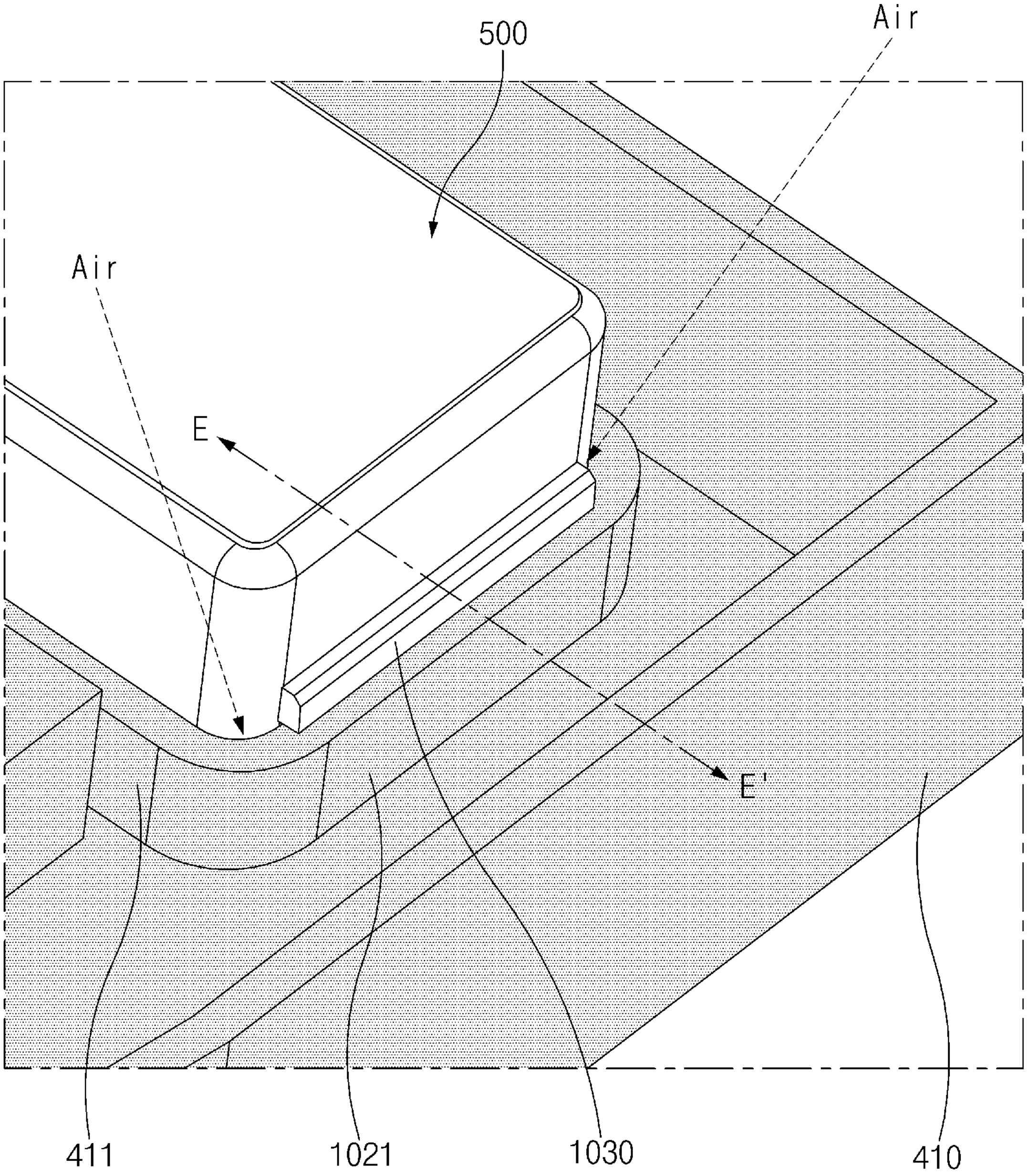
Figure 10E:
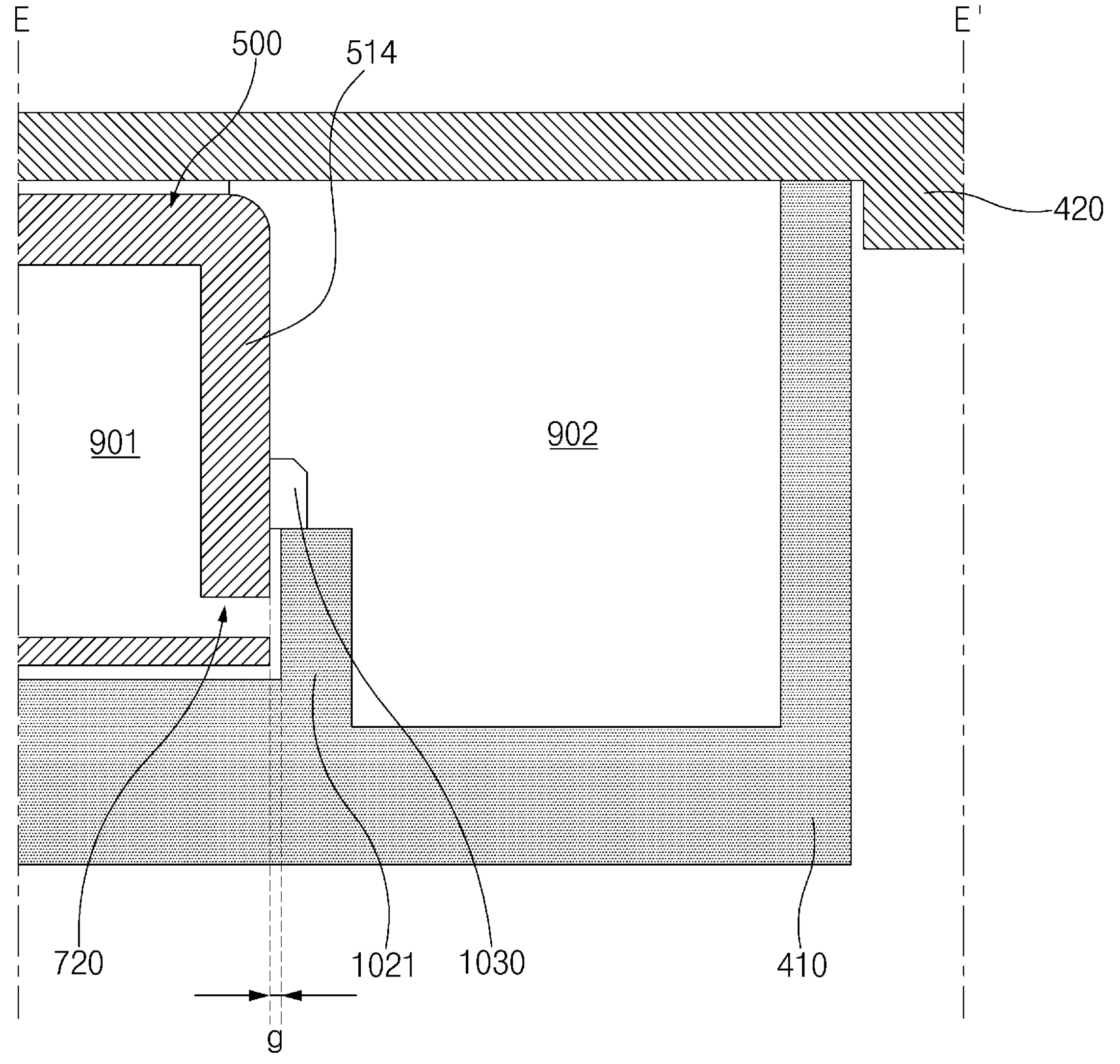

FIGS. 10A, 10B, 10C, 10D and 10E are views illustrating a protection structure applied to a second motor ventilation hole of an electronic device according to various embodiments. FIG. 10B is a cross-sectional view illustrating a coupling relationship between the first enclosure and the second enclosure, taken along line C-C' of FIG. 10A. FIG. 10C is a cross-sectional view illustrating a coupling relationship between the first enclosure and the second enclosure, taken along line D-D' of FIG. 10A. FIG. 10E is a cross-sectional view illustrating a coupling relationship between the first enclosure and the second enclosure, taken along line E-E' of FIG. 10D. In FIGS. 10A, 10B, 10C, 10D and 10E, configurations that are the same as or similar to those of FIGS. 4 to 9B are provided with the same reference numerals, and a repeated description will not be provided.

Referring to FIGS. 10A, 10B, 10C, 10D and 10E, a protection structure 1021 may be integrally formed with at least any one of the first enclosure 410 and the second enclosure 420. The protection structure 1021 may be integrally formed with any one of the first enclosure 410 and the second enclosure 420, and may protrude toward the remaining one of the first enclosure 410 and the second enclosure 420. For example, the protection structure 1021 may be integrally formed with the first enclosure 410, and may protrude toward the second enclosure 420.

The protection structure 1021 may be formed to face the second motor ventilation hole 720 around the second motor ventilation hole 720. The protection structure 1021 may be disposed to fully overlap the second motor ventilation hole 720. The protection structure 1021 may be disposed to be spaced apart from the side surface of the motor housing 500 including the second motor ventilation hole 720. The protection structure 1021 may be a part of the seating structure 411, and may be formed as one structure with the seating structure 411 or may be formed to be separated and spaced apart from the seating structure 411.

The seating structure 411 may be formed to overlap at least a portion of the side surface of the motor housing 500, except for the second motor ventilation hole 720. The seating structure 411 and the protection structure 1021 may be formed parallel to the side surface 514 of the motor housing 500 while being spaced apart from the side surface 514 of the motor housing 500. The protection structure 1021 may have a height that is the same as or different from that of the seating structure 411. A gap "g" between the protection structure 1021 and the side surface 514 of the motor housing 500 may be the same as or different from a gap "g" between the seating structure 411 and the side surface 514 of the motor housing 500. As an example, the protection structure 1021 may be disposed to be closer to or farther from the side surface of the motor housing 500 than the seating structure 411.

The protection structure 1021 may be disposed to be spaced apart from the side surface 514 of the motor housing 500 having the motor ventilation hole 700, while the gap "g" that is smaller than the size of the sound absorbing member (e.g., the sound absorbing member 540 of FIG. 5) is interposed therebetween. For example, the protection structure 1021 may be spaced apart from the side surface 514 of the motor housing 500 having the second motor ventilation hole 720, and the gap "g" of 0.01 mm to 0.3 mm may be interposed therebetween. Because the sound absorbing member cannot pass through the gap "g" between the side surface 514 of the motor housing 500 and the protection structure 1021, the sound absorbing member cannot pass through the second motor ventilation hole 720. Even when the sound absorbing member is broken, the broken sound absorbing member cannot pass through the second motor ventilation hole 720. Accordingly, a defect caused as the second motor ventilation hole 720 is blocked by the sound absorbing member may be prevented, and the sound absorbing member may be prevented from being introduced into the second resonance space that is the inner space 901 of the motor housing 500 through the second motor ventilation hole 720.

According to various embodiments, as illustrated in FIGS. 10D and 10E, a fixing member 1030 may be disposed between at least any one of the protection structure 1021 and the seating structure 411, and the motor housing 500. For example, the fixing member 1030 may be disposed between the one surface of the protection structure 1021 and the side surface 514 of the motor housing 500. The fixing member 1030 may be formed of a bonding adhesive, the sound absorbing member, sponge, or a tape. Due to the fixing member 1030, the air may be introduced and discharged in one surface direction through opposite sides of the fixing member 1030 to be ventilated.

Figure 11A:
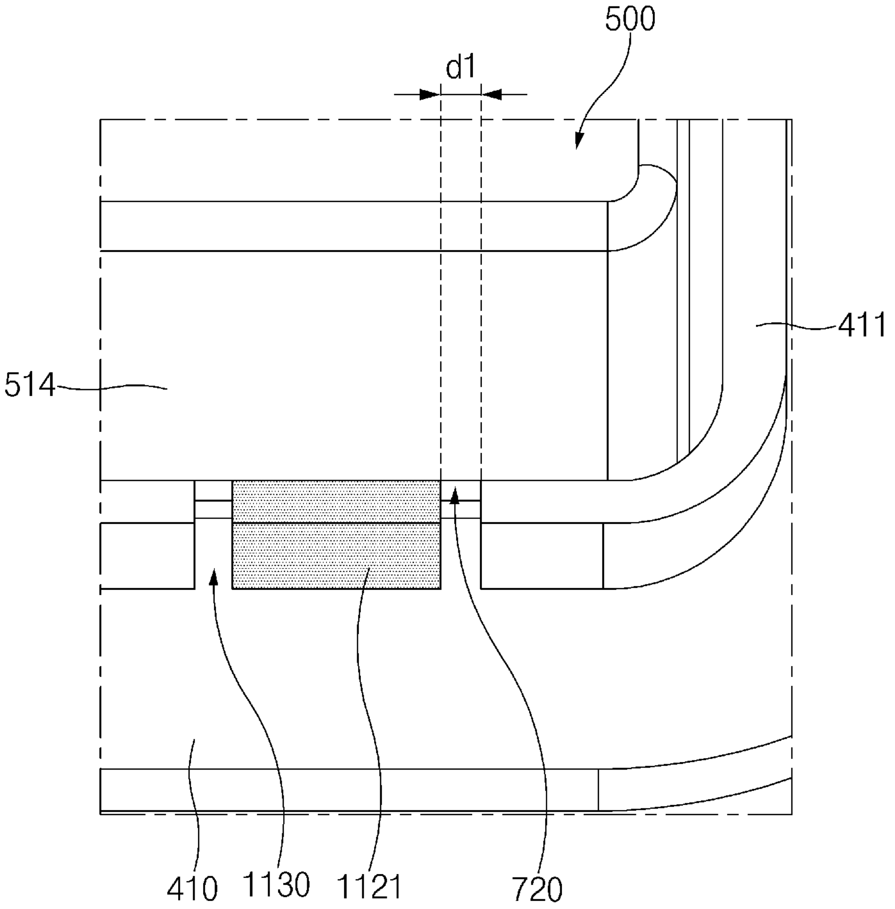
FIGS. 11A, 11B and 11C are views illustrating a protection structure applied to a second motor ventilation hole of an electronic device according to various embodiments.
Figure 11B:
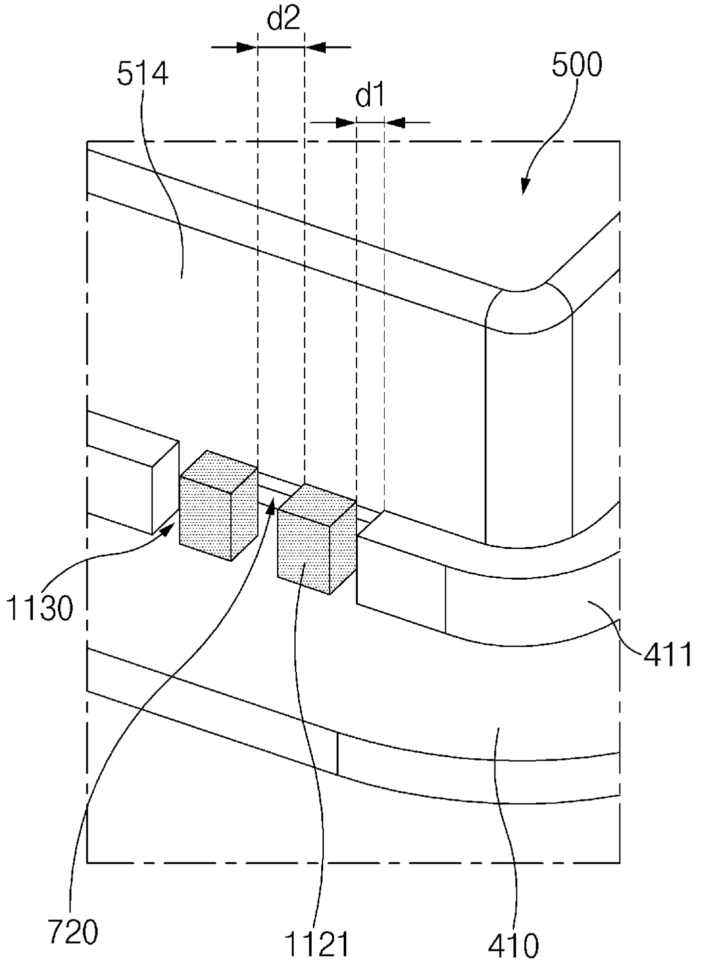
Figure 11C:
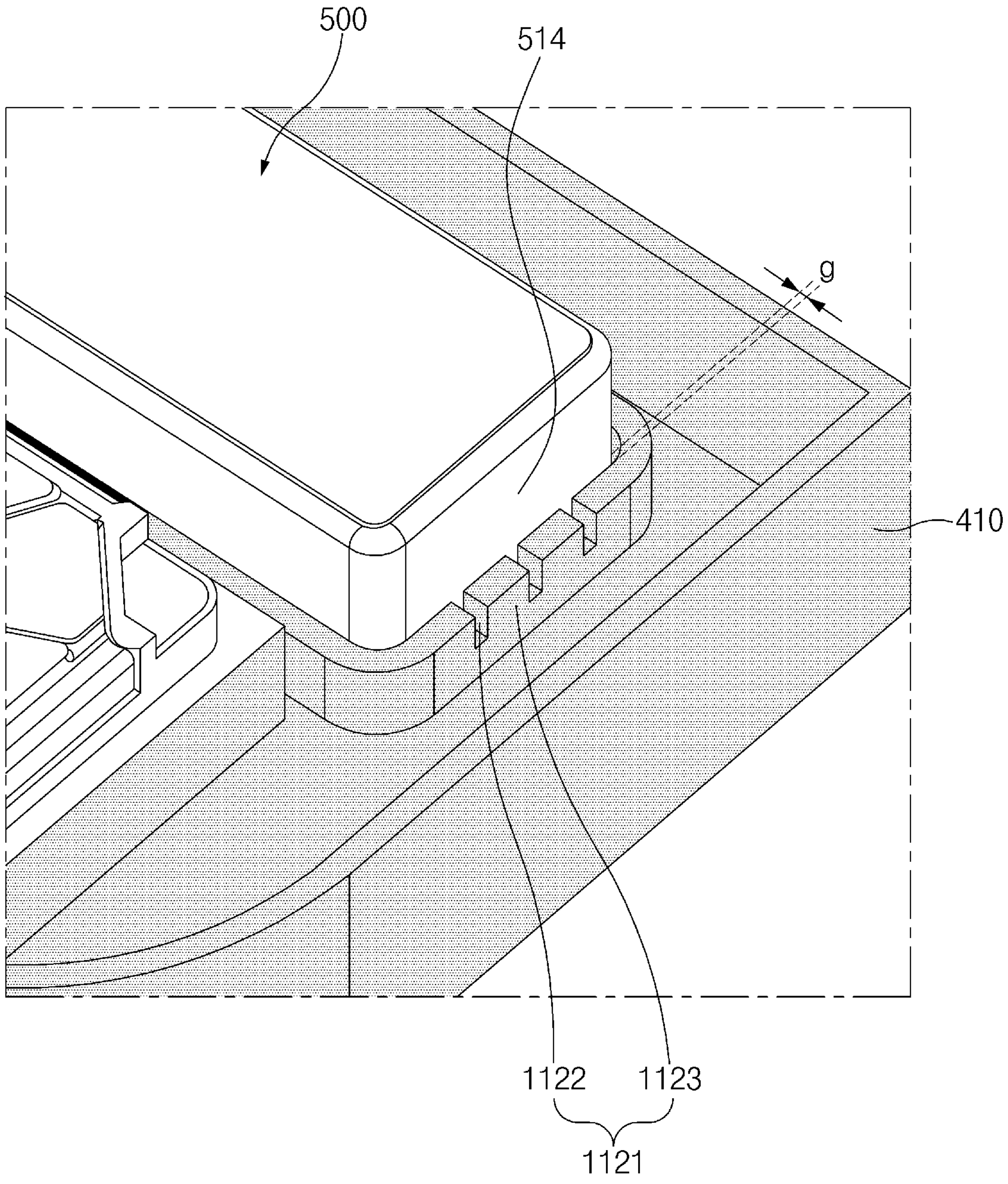

FIGS. 11A, 11B and 11C are views illustrating a protection structure applied to a second motor ventilation hole of an electronic device according to various embodiments. In FIGS. 11A, 11B and to 11C, configurations that are the same as or similar to those of FIGS. 4 to 9B are provided with the same reference numerals, and a repeated description will not be provided.

Referring to FIGS. 11A, 11B and 11C, at least one protection structure 1121 disposed on the first enclosure 410 may be formed to overlap a portion of the at least one ventilation hole 720. The protection structure 1121 may be formed of the same material as that of the seating structure 411 that provides a seating space of the vibration motor module 510. The seating structure 411 and the protection structure 1121 may be integrally formed with the first enclosure 410. The protection structure 1121 may be disposed to be spaced apart from the side surface 514 of the motor housing 500, in which the second motor ventilation hole 720 is formed, while a specific gap being interposed therebetween. The specific gap "g" may be smaller than the sound absorbing member (e.g., the sound absorbing member 540 of FIG. 5) or the air suction material (e.g., the air suction material 541 of FIG. 5).

For example, one protection structure 1121, as illustrated in FIG. 11A, may be disposed between the seating structures 411. The protection structure 1121 may be disposed to be spaced apart from the seating structure 411 by a first spacing distance d1 that is smaller than a size of the sound absorbing member (e.g., the sound absorbing member 540 of FIG. 5) or the air suction material (e.g., the air suction material 541 of FIG. 5). For example, the protection structure 1121 may be spaced apart from the seating structure 411 while a spacing space 1130 having the first spacing distance d1 of 0.01 mm to 0.3 mm being interposed therebetween.

For example, a plurality of protection structure 1121, as illustrated in FIG. 11B, may be disposed between the seating structures 411. The protection structure 1121 may be spaced apart from the seating structure 411 by the first spacing distance. The plurality of protection structures 1121 may be disposed to be spaced apart from each other by a second spacing distance d2. The second spacing distance d2 may be the same as the first spacing distance d1 or different from the first spacing distance d1. The first spacing distance d1 and the second spacing distance d2 may be smaller than the size of the sound absorbing member. For example, the plurality of protection structures 1121 may be disposed to be spaced apart from each other by the second spacing distance d2 of 0.01 mm to 0.3 mm.

As another example, the protection structure 1121, as illustrated in FIG. 11C, may have a convexo-concave shape. The protection structure 1121 may include concave areas 1122 and convex areas 1123. The second motor ventilation hole 720 may not overlap the concave areas 1122, and may overlap the remaining areas of the protection structure 1121, except for the concave areas 1122. The second motor ventilation hole 720 may be disposed to face the remaining areas of the protection structure 1121, except for the concave areas 1122. A width of the concave area 1122 corresponding to a space between the convex areas 1123, and a length of the concave area 1122 may be smaller than a size of the sound absorbing member. For example, the width of the concave area 1122, and the length of the concave area 1122 may be 0.01 mm to 0.3 mm.

In the electronic device having the protection structure 1121 illustrated in FIGS. 11A, 11B and 11C, the sound absorbing member cannot pass between the side surface 514 of the motor housing 500 and the protection structure 1121. Furthermore, the sound absorbing member cannot pass between the protection structure 1121 and the seating structure 411, and also cannot pass between the protection structures 1121. Due to the protection structure 1121, the sound absorbing member cannot pass through the second motor ventilation hole 720. Even when the sound absorbing member is broken, the broken sound absorbing member cannot pass through the second motor ventilation hole 720. Accordingly, a defect caused as the second motor ventilation hole 720 is blocked by the sound absorbing member may be prevented, and the sound absorbing member may be prevented from being introduced into the inner space of the motor housing 500 through the second motor ventilation hole 720.

Figure 12:
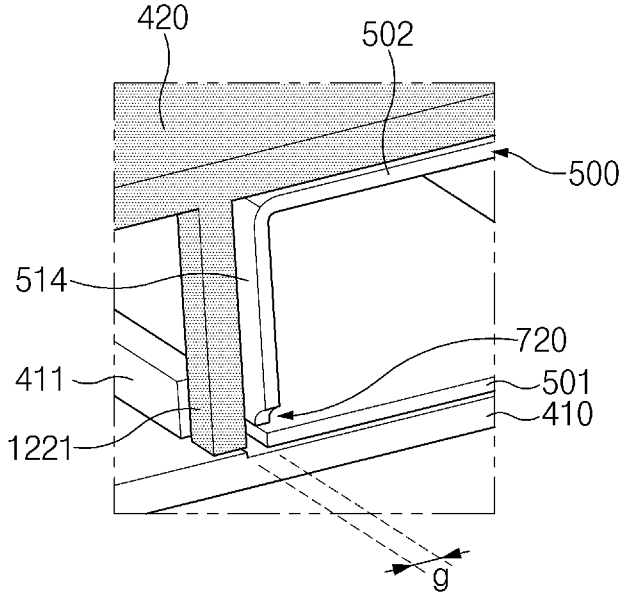
FIG. 12 is a view illustrating a protection structure applied to a second motor ventilation hole of an electronic device according to various embodiments.

FIG. 12 is a view illustrating a protection structure applied to a second motor ventilation hole of an electronic device according to various embodiments. In FIG. 12, configurations that are the same as or similar to those of FIGS. 4 to 9B are provided with the same reference numerals, and a description thereof will not be repeated.

Referring to FIG. 12, at least one protection structure 1221 may be formed to partially overlap the at least one second motor ventilation hole 720. The protection structure 1121 may be formed of the same material as that of the second enclosure 420 that faces the second surface 502 of the motor housing 500. The protection structure 1221 may be integrally formed with the second enclosure 420. As another example, the protection structure 1121 may be integrally formed with an assembly disposed between the second enclosure 420 and the motor housing 500. The protection structure 1221 may extend perpendicularly to the second enclosure 420 or the assembly toward the first enclosure 410 from the second enclosure 420 or the assembly. The seating structure 411 may be formed of the same material as that of the first enclosure 410. The seating structure 411 may be integrally formed with the first enclosure 410. The seating structure 411 may extend perpendicularly to the second enclosure 420 toward the second enclosure 420 from the first enclosure 410.

The protection structure 1221 may be disposed to be spaced apart from the side surface 514 of the motor housing 500, in which the second motor ventilation hole 720 is formed, while the specific gap "g" is interposed therebetween. The protection structure 1221 may be disposed to be spaced apart from the side surface 514 of the motor housing 500, in which the second motor ventilation hole 720 is formed, while the specific gap "g" that is smaller than the size of the sound absorbing member being interposed therebetween. For example, the protection structure 1221 may be spaced apart from the side surface 514 of the motor housing 500, in which the second motor ventilation hole 720 is formed, while the specific gap "g" of 0.01 mm to 0.3 mm being interposed therebetween.

The protection structure 1221 may be disposed to contact or be spaced apart from the seating structure 411 by a spacing distance that is smaller than the size of the sound absorbing member. For example, the protection structure 1221 may be spaced apart from the seating structure 411 by a spacing distance of 0.01 mm to 0.3 mm.

Due to the protection structure 1221, the sound absorbing member cannot pass between the side surface 514 of the motor housing 500 and the protection structure 1221. Furthermore, the sound absorbing member cannot pass between the protection structure 1221 and the seating structure 411. Due to the protection structure 1221, the sound absorbing member cannot pass through the second motor ventilation hole 720. Even when the sound absorbing member is broken, the broken sound absorbing member cannot pass through the second motor ventilation hole 720. Accordingly, a defect caused as the second motor ventilation hole 720 is blocked by the sound absorbing member may be prevented, and the sound absorbing member may be prevented from being introduced into the interior of the motor housing 500 through the second motor ventilation hole 720.

Figure 13A:
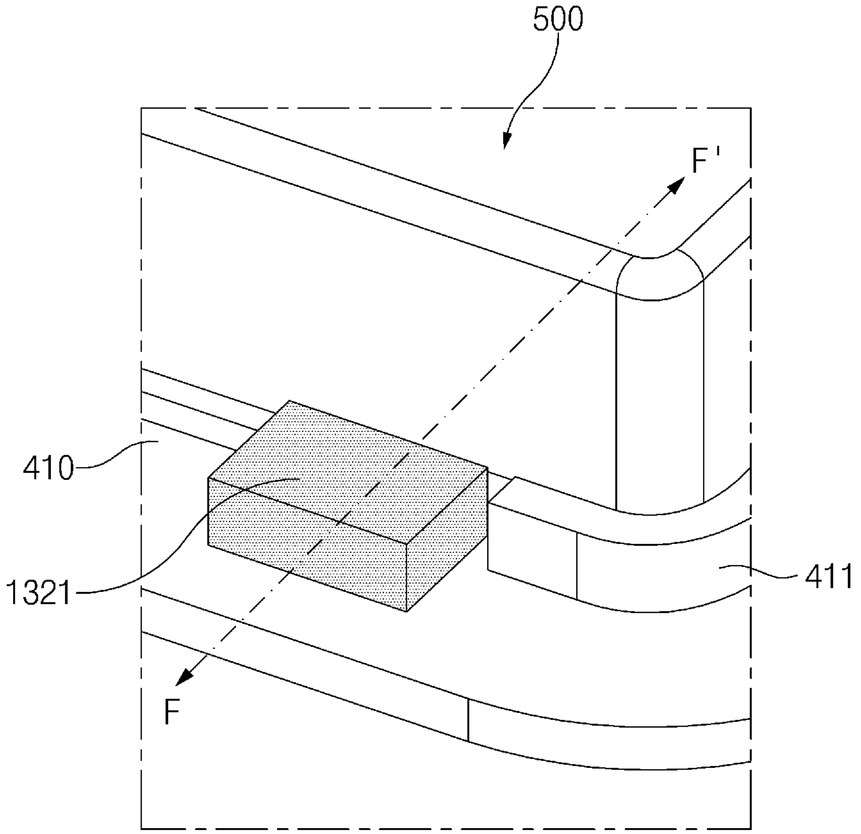
FIGS. 13A and 13B are views illustrating a protection structure applied to a second motor ventilation hole of an electronic device according to various embodiments.
Figure 13B:
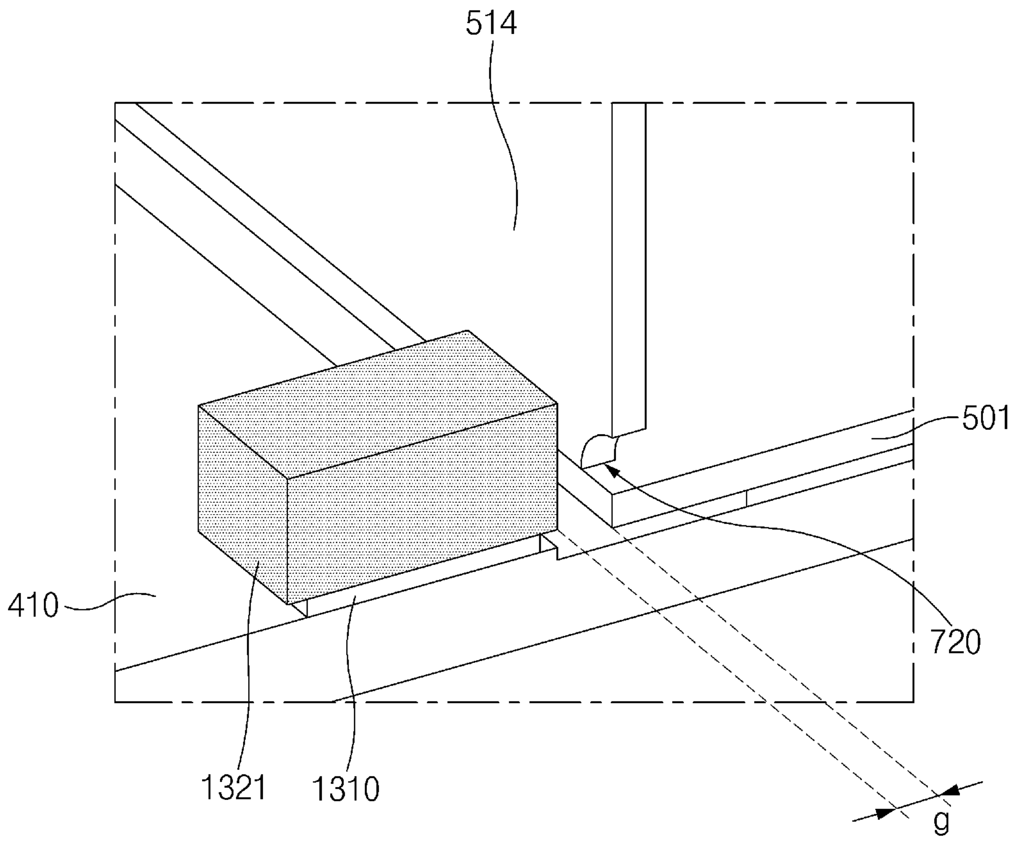

FIGS. 13A, 13B, 14 and 15 are views illustrating a protection structure applied to a second motor ventilation hole of an electronic device according to various embodiments. FIG. 13B is a view taken along line F-F' of FIG. 13. In FIGS. 13A, 13B, 14 and 15, configurations that are the same as or similar to those of FIGS. 4 to 9B are provided with the same reference numerals, and a description thereof will not be repeated.

Referring to FIGS. 13A, 13B, 14 and 15, the protection structures 1321, 1421, and 1521 may be implemented as a separate structure from the first enclosure 410. The protection structures 1321, 1421, and 1521 may be formed to face the second motor ventilation hole 720 around the second motor ventilation hole 720. The protection structures 1321, 1421, and 1521 may be disposed to be spaced apart from the side surface 514 of the motor housing 500 having the second motor ventilation hole 720.

The seating structure 411 may be formed to overlap at least a portion of the side surface 514 of the motor housing 500, except for the second motor ventilation hole 720. The seating structure 411 may be formed to extend from at least any one of the first enclosure 410 and the second enclosure 420 substantially perpendicularly. The seating structure 411 may be formed parallel to the side surface 514 of the motor housing 500 while being spaced apart from the side surface 514 of the motor housing 500.

The protection structures 1321, 1421, and 1521 may have a height that is the same as or different from that of the seating structure 411. The gaps "g" of the protection structures 1321, 1421, and 1521 and the seating structure 411 from the side surface 514 of the motor housing 500 having the second motor ventilation hole 720 may be the same or different.

The protection structures 1321, 1421, and 1521 may be formed of a sponge material, a 2-dimensional or 3-dimensional mesh material, a rubber material, a stainless steel material, a plastic material, or a material, in which at least two thereof are mixed. The protection structures 1321, 1421, and 1521 may be formed through a dispensing scheme, for example, by using bonding or expandable sponge.

The protection structures 1321, 1421, and 1521 may be formed in various forms. As an example, the protection structure 1321 illustrated in FIGS. 13A and 13B may have a polyhedral shape (e.g., a hexagonal shape). One surface of the protection structure 1321 may be attached to the first enclosure 410 through an adhesive member 1310. The side surface of the protection structure 1321, which is substantially perpendicular to one surface thereof, which is attached to the adhesive member 1310, may be disposed to be spaced apart from the side surface 514 of the motor housing 500 having the second motor ventilation hole 720 by the specific gap "g". The specific gap "g" may be smaller than the air absorbing material (e.g., the air suction material 541 of FIG. 5) that constitutes the sound absorbing member (e.g., the sound absorbing member 540 of FIG. 5). Accordingly, a defect caused as the first motor ventilation hole (e.g., the ventilation hole 700 of FIG. 7) as well as the second motor ventilation hole 720 is blocked due to the air absorbing material included in the sound absorbing member may be prevented. Furthermore, the air adsorbing material included in the sound absorbing member may be prevented from being introduced into the motor housing 500.

Figure 14:
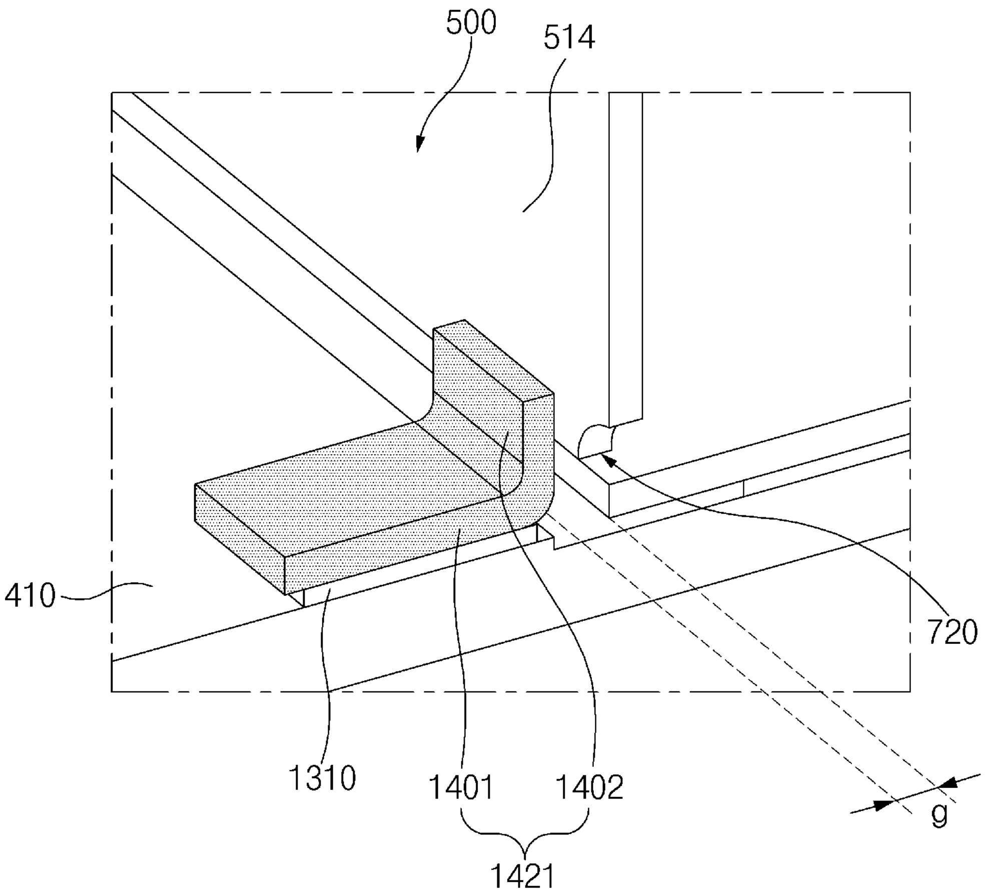
FIG. 14 is a view illustrating a protection structure applied to a second motor ventilation hole of an electronic device according to various embodiments.

As another example, the protection structure 1421 illustrated in FIG. 14 may include a first protection area 1401 that is attached to the first enclosure 410, and a second protection area 1402 that is spaced apart from the side surface 514 of the motor housing 500 having the second motor ventilation hole 720. The first protection area 1401 and the second protection area 1402 may be formed to be substantially perpendicular to each other. The second protection area 1402 of the protection structure 1421 may be disposed to be spaced apart from the side surface of the motor housing 500 having the second motor ventilation hole 720 while the specific gap "g" is interposed therebetween. The specific gap "g" may be smaller than the air absorbing material (e.g., the air suction material 541 of FIG. 5) that constitutes the sound absorbing member (e.g., the sound absorbing member 540 of FIG. 5). Accordingly, a defect of blocking the first motor ventilation hole (e.g., the ventilation hole 700 of FIG. 7) as well as the second motor ventilation hole 720 due to the air absorbing material included in the sound absorbing member may be prevented. Furthermore, the air adsorbing material included in the sound absorbing member may be prevented from being introduced into the motor housing 500.

Figure 15:
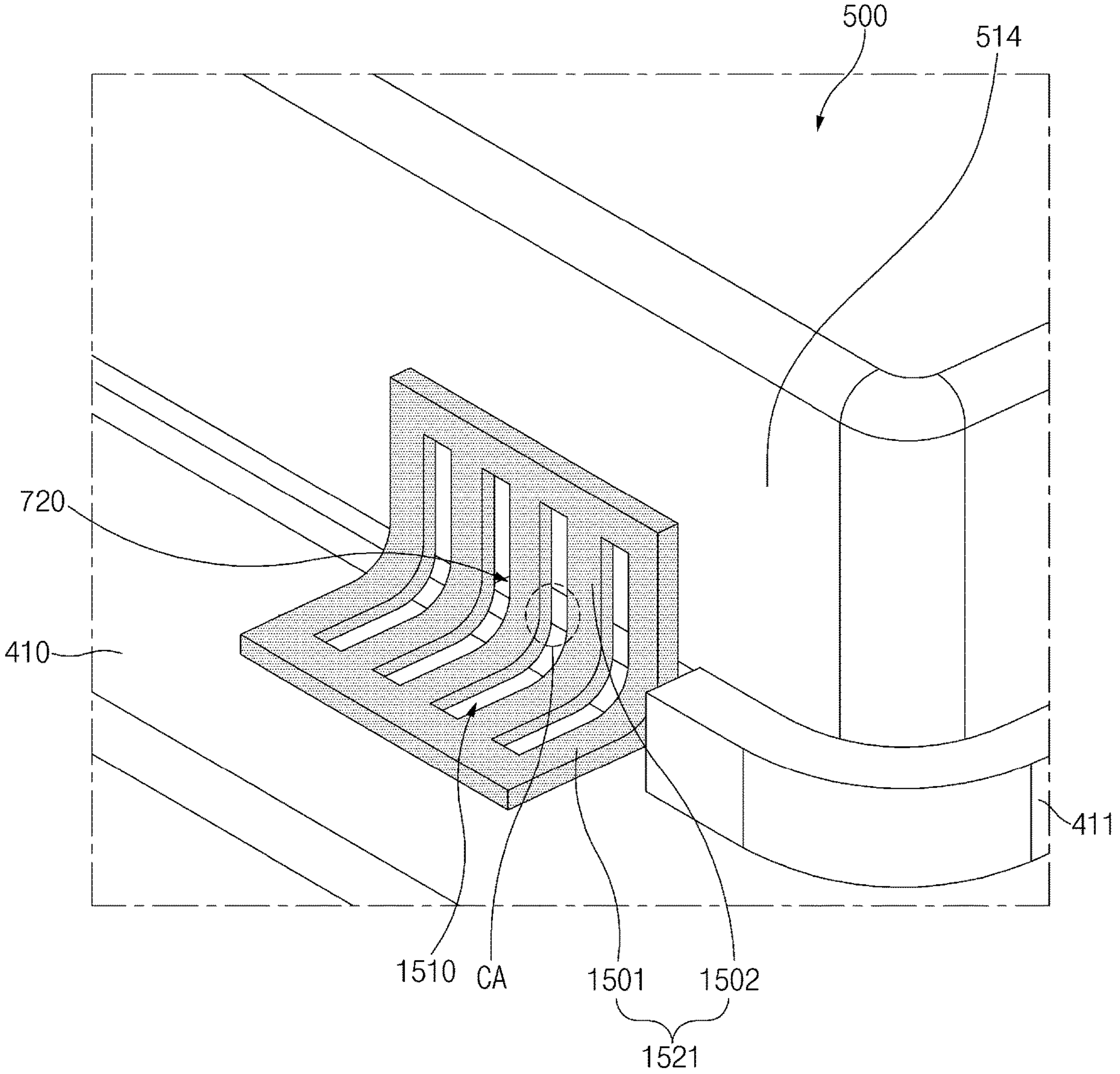
FIG. 15 is a view illustrating a protection structure applied to a second motor ventilation hole of an electronic device according to various embodiments.

As another example, the protection structure 1521 illustrated in FIG. 15 may include a first protection area 1501 that is attached to the first enclosure 410, and a second protection area 1502 that is spaced apart from the side surface 514 of the motor housing 500 having the second motor ventilation hole 720. The second protection area 1502 may be attached to the side surface 514 of the motor housing 500 or be spaced apart from the side surface 514 of the motor housing 500. The protection structure 1521 may include at least one slit 1510. The at least one slit 1510 may overlap the at least one second motor ventilation hole 720, and may be connected to the second motor ventilation hole 720. Through the at least one slit 1510 and the at least one second motor ventilation hole 720, air may flow between an inside and an outside of the vibration motor module (e.g., the vibration motor module 510 of FIG. 5). The interior air of the vibration motor module may be discharged to the outside of the vibration motor module through the at least one slit 1510 and the at least one second motor ventilation hole 720. The exterior air may be introduced into the vibration motor module through the at least one slit 1510 and the at least one second motor ventilation hole 720. The at least one slit 1510 may be formed at at least a portion of the second protection area 1502 of the protection structure 1521, or may be formed at at least a portion of the first protection area 1501 and a portion of the second protection area 1502 of the protection structure 1521. A width of the at least one slit 1510 may be smaller than a size of the sound absorbing member. The at least one slit 1510 may be disposed to cross the second motor ventilation hole 720. At least a partial area of the at least one slit 1510 may overlap a partial area of the second motor ventilation hole 720. A size of an area CA, in which the at least one slit 1510 and the at least one second motor ventilation hole 720 cross (or overlap) each other, may be smaller than a size of the sound absorbing member. Accordingly, a defect caused as the second motor ventilation hole 720 is blocked by the sound absorbing member may be prevented, and the sound absorbing member may be prevented from being introduced into the inner space of the motor housing 500 through the second motor ventilation hole 720 and the slit 1510.

Figure 16A:
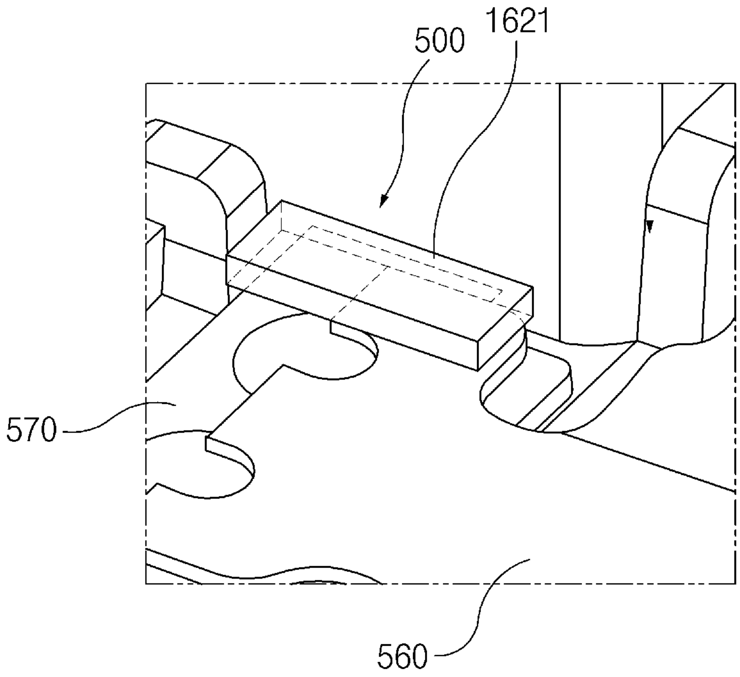
FIGS. 16A, 16B, 16C and 16D are views illustrating a protection structure applied to a first motor ventilation hole of an electronic device according to various embodiments.
Figure 16B:
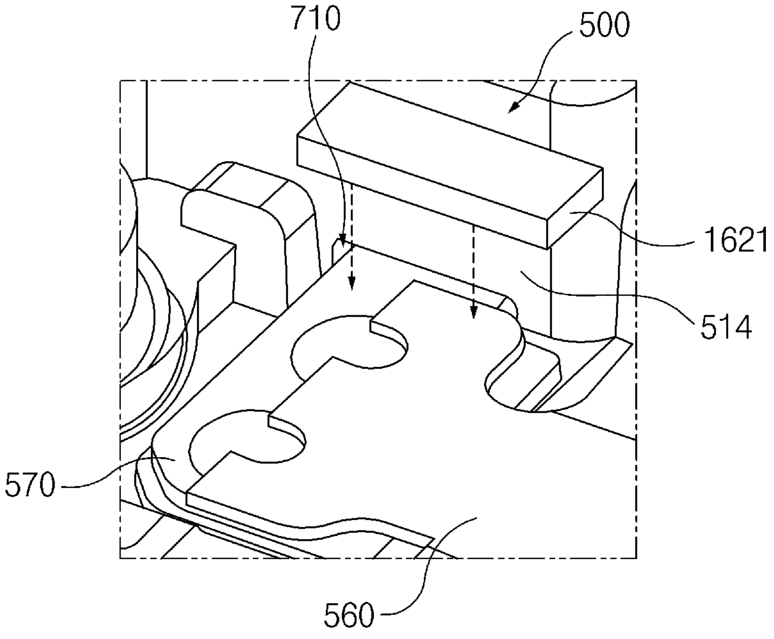
Figure 16C:
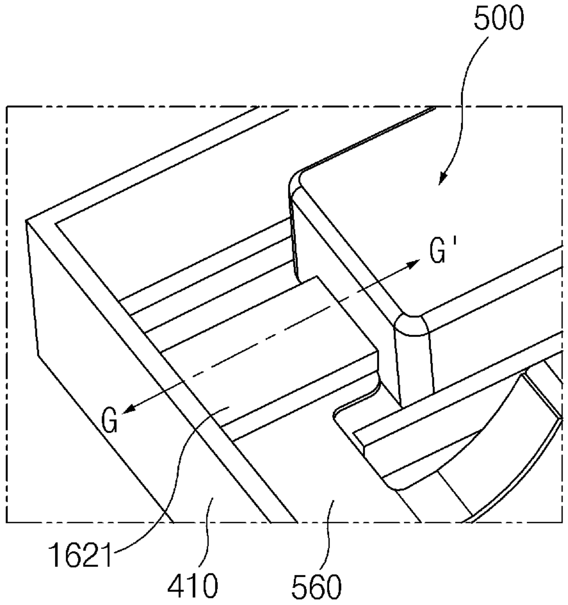
Figure 16D:
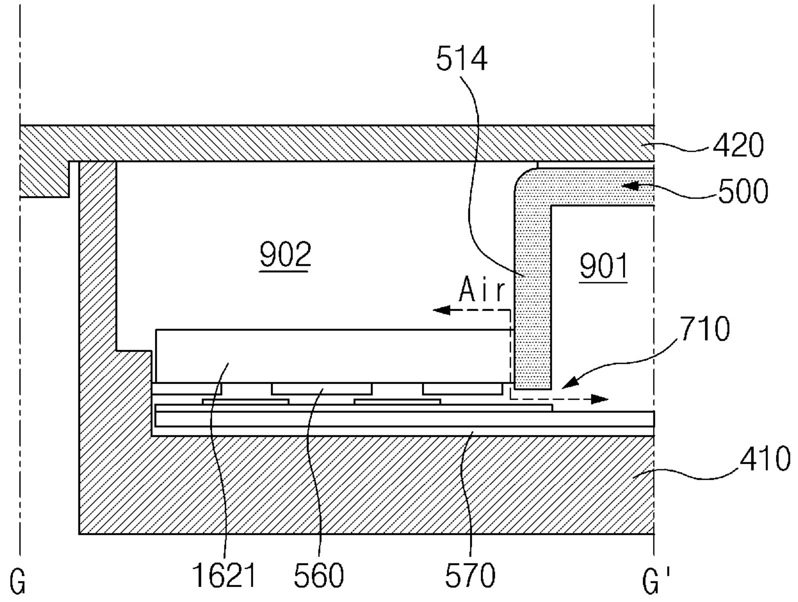

FIGS. 16A, 16B, 16C and 16D are views illustrating a protection structure applied to a first motor ventilation hole of an electronic device according to various embodiments. FIG. 16D is a cross-sectional view illustrating a coupling relationship between the first enclosure and the second enclosure, taken along line G-G' of FIG. 16C. In FIGS. 16A, 16B, 16C and 16D, configurations that are the same as or similar to those of FIGS. 4 to 9B are provided with the same reference numerals, and a description thereof will be replaced by the description made in FIGS. 4 to 9B.

Referring to FIGS. 16A, 16B, 16C and 16D, the electronic device according to various embodiments may include the second circuit board 570 connected to the vibration motor module, and the first circuit board 560, to which the speaker module and the second circuit board 570 are electrically connected.

A protection structure 1621 may be disposed on the first circuit board 560 and the second circuit board 570. The protection structure 1621 may be formed in the first motor ventilation hole 710 to face a residual space of the first motor ventilation hole 710, which is left after the second circuit board 570 is accommodated. The protection structure 1621 may be formed of a sponge material, a 2-dimensional or 3-dimensional mesh material, a rubber material, a stainless steel material, a plastic material, or a material, in which at least two thereof are mixed. The protection structure 1621 may be formed through a dispensing scheme, for example, by using bonding or expandable sponge.

The gap "g" between the protection structure 1621 and the side surface 514 of the motor housing 500 having the first motor ventilation hole 710 may be smaller than the size of the sound absorbing member (e.g., the sound absorbing member 540 of FIG. 5). Accordingly, a defect caused as the first motor ventilation hole 710 is blocked by the sound absorbing member may be prevented, and the sound absorbing member may be prevented from being introduced into the inner space of the motor housing 500 through the first motor ventilation hole 710.

As an example, the protection structure 1621, as illustrated in FIGS. 16A and 16B, may overlap a partial area of the first circuit board 560 disposed on the second circuit board 570, and may not overlap the remaining areas of the first circuit board 560 disposed on the second circuit board 570. The protection structure 1621 may be formed to cover the partial area of the first circuit board 560 disposed on the second circuit board 570, and may be formed not to cover the remaining areas of the first circuit board 560 disposed on the second circuit board 570.

As another example, the protection structure 1621, as illustrated in FIGS. 16C and 16D, may overlap the entire area of the first circuit board 560 disposed on the second circuit board 570. The protection structure 1621 may fill a space between a side surface of the motor housing 500 and a side surface of the first enclosure 410, which face each other. The protection structure 1621 may contact the side surface of the motor housing 500 having the first motor ventilation hole 710. Because the protection structure 1621 is formed of a material having a ventilation property, the air may flow through the protection structure 1621 and the first motor ventilation hole 710.

Figure 17A:
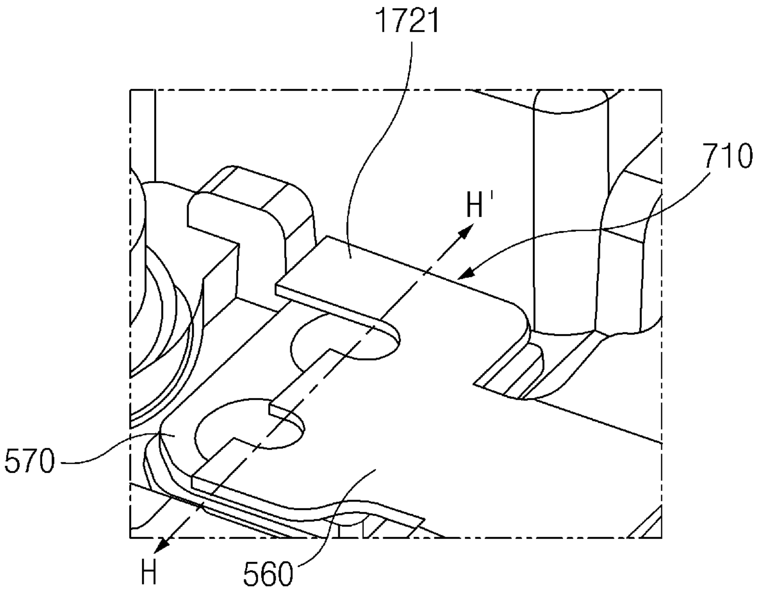
FIGS. 17A and 17B are views illustrating a protection structure applied to a first motor ventilation hole of an electronic device according to various embodiments.
Figure 17B:
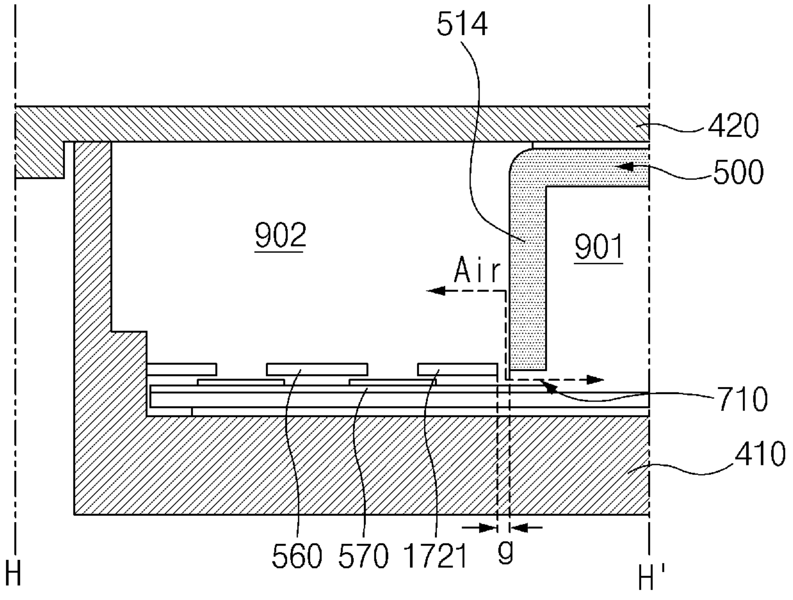

FIGS. 17A is a view illustrating a protection structure applied to a first motor ventilation hole of an electronic device according to various embodiments. FIG. 17B is a cross-sectional view illustrating a coupling relationship between the first enclosure and the second enclosure, taken along line H-H' of FIG. 17A. In FIGS. 17A and 17B, configurations that are the same as or similar to those of FIGS. 4 to 9B are provided with the same reference numerals, and a description thereof will not be repeated.

Referring to FIGS. 17A and 17B, the protection structure 1721 may be formed as a partial area of the first circuit board 560, which is adjacent to the first motor ventilation hole 710, extends to face the first motor ventilation hole 710. The protection structure 1721 may be formed of the same material and stack structure as those of the first circuit board 560. The protection structure 1721 may be integrally formed with the first circuit board 560 to be disposed on the second circuit board 570.

The gap "g" between the protection structure 1721 and the side surface 514 of the motor housing 500 having the first motor ventilation hole 710 may be smaller than the size of the sound absorbing member (e.g., the sound absorbing member 540 of FIG. 5). A defect caused as the first motor ventilation hole 710 is blocked by the sound absorbing member may be prevented, and the sound absorbing member may be prevented from being introduced into the inner space 901 of the motor housing 500 through the first motor ventilation hole 710. Accordingly, the air may flow between the inner space 901 disposed between the first enclosure 410 and the second enclosure 420, and the outer space 902.

Figure 18:
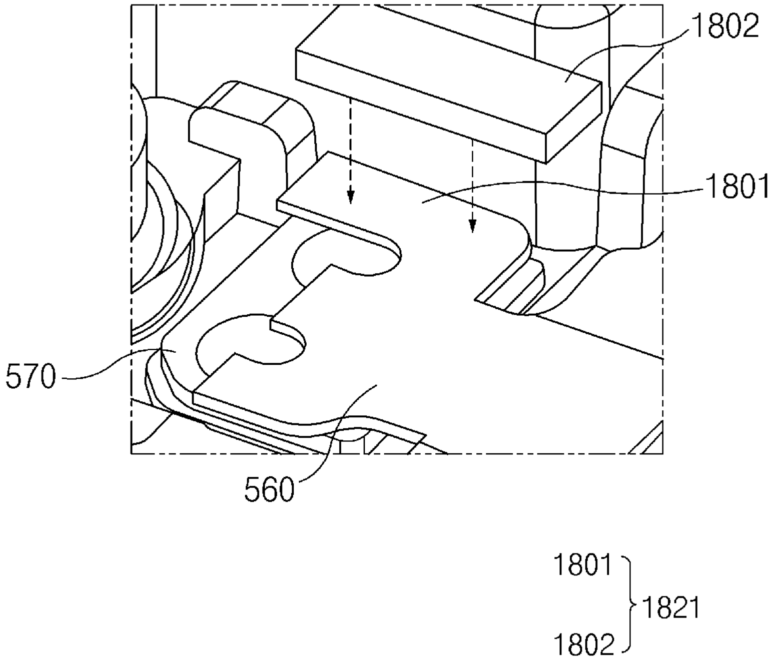
FIG. 18 is a view illustrating a protection structure applied to a first motor ventilation hole of an electronic device according to various embodiments.

FIG. 18 is a view illustrating a protection structure applied to a first motor ventilation hole of an electronic device according to various embodiments. In FIG. 18, configurations that are the same as or similar to those of FIGS. 4 to 9B are provided with the same reference numerals, and a description thereof will not be repeated.

Referring to FIG. 18, a protection structure 1821 may include a first protection structure 1801 and a second protection structure 1802.

The first protection structure 1801 may be formed as a partial area of the first circuit board 560, which is adjacent to the first motor ventilation hole 710, extends to face the first motor ventilation hole (e.g., the first motor ventilation hole 710 of FIG. 7A). The first protection structure 1801 may be formed of the same material and stack structure as those of the first circuit board 560. The first protection structure 1801 may be integrally formed with the first circuit board 560 to be disposed on the second circuit board 570.

The second protection structure 1802 may be disposed on the first protection structure 1801. The second protection structure 1802 may be formed to face a residual space of the first motor ventilation hole, which does not face the second circuit board 570 and the first protection structure 1801 to be left. The second protection structure 1802 may be formed of a material that is the same as or different from that of the first protection structure 1801. For example, the second protection structure 1802 may be formed of a sponge material, a 2-dimensional or 3-dimensional mesh material, a rubber material, a stainless steel material, a plastic material, or a material, in which at least two thereof are mixed. The second protection structure 1802 may be formed through a dispensing scheme, for example, by using bonding or expandable sponge.

The spacing distance between the protection structure 1821 and the side surface of the motor housing having the first motor ventilation hole 710 may be smaller than the size of the sound absorbing member (e.g., the sound absorbing member 540 of FIG. 5). Accordingly, a defect caused as the first motor ventilation hole is blocked by the sound absorbing member may be prevented, and the sound absorbing member may be prevented from being introduced into the inner space of the motor housing through the first motor ventilation hole.

Figure 19A:
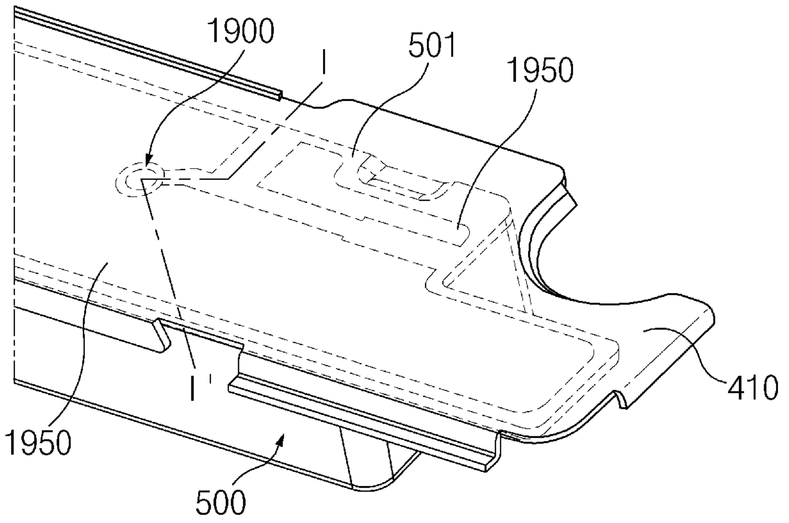
FIGS. 19A and 19B are views illustrating a vibration motor module, in which an auxiliary motor ventilation hole is formed on one surface thereof, in an electronic device according to various embodiments.
Figure 19B:
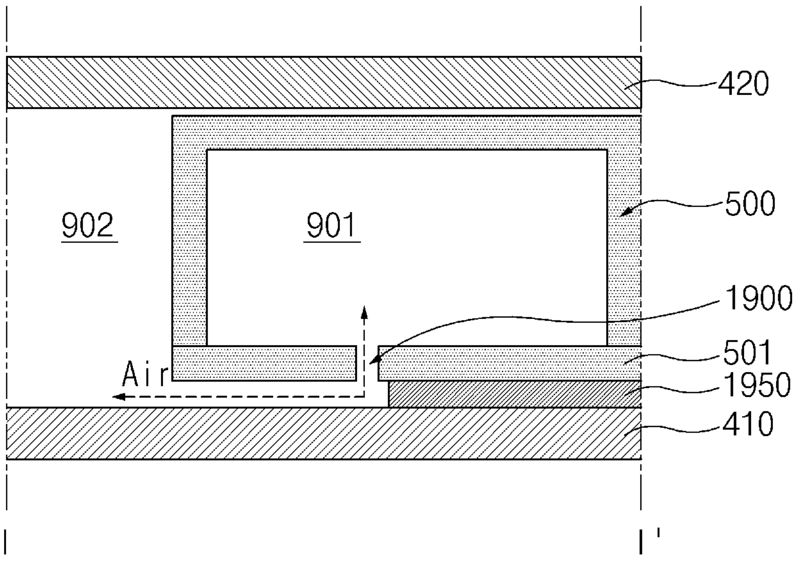

FIG. 19A is a view illustrating a vibration motor module, in which an auxiliary motor ventilation hole is formed on one surface thereof, in an electronic device according to various embodiments. FIG. 19B is a cross-sectional view illustrating a coupling relationship between the first enclosure and the second enclosure, taken along line I-I' of FIG. 19A. In FIGS. 19A and 19B, configurations that are the same as or similar to those of FIGS. 4 to 9B are provided with the same reference numerals, and a description thereof will be replaced by the description made in FIGS. 4 to 9B.

Referring to FIGS. 19A and 19B, at least one auxiliary motor ventilation hole 1900 may be formed on the first surface 501 of the motor housing 500 seated in the first enclosure 410. An adhesive member 1950 may be disposed between the first enclosure 410 and the first surface 501 of the motor housing 500. The adhesive member 1950 may be an adhesive tape, poron, or a bonding adhesive.

A plurality of adhesive members 1950 may be provided, and the adjacent adhesive members 1950 may be disposed to be spaced apart from each other. The spacing spaces between the adhesive members 1950 may be used as a pipeline that connect the auxiliary motor ventilation hole 1900, the first resonance space that is the outer space (e.g., the outer space 902 of FIG. 9A) of the motor housing 500 and the second resonance space that is the inner space (e.g., the inner space 901 of FIG. 9A) of the motor housing 500.

A thickness of the adhesive member 1950 corresponding to the gap between the first enclosure 410 and the first surface 501 of the vibration motor module 510 may be smaller than the size of the sound absorbing member (e.g., the sound absorbing member 540 of FIG. 5). Accordingly, a defect caused as the auxiliary motor ventilation hole 1900 is blocked by the sound absorbing member may be prevented, and the sound absorbing member may be prevented from being introduced into the inner space of the motor housing 500 through the auxiliary motor ventilation hole 1900.

Figure 20:
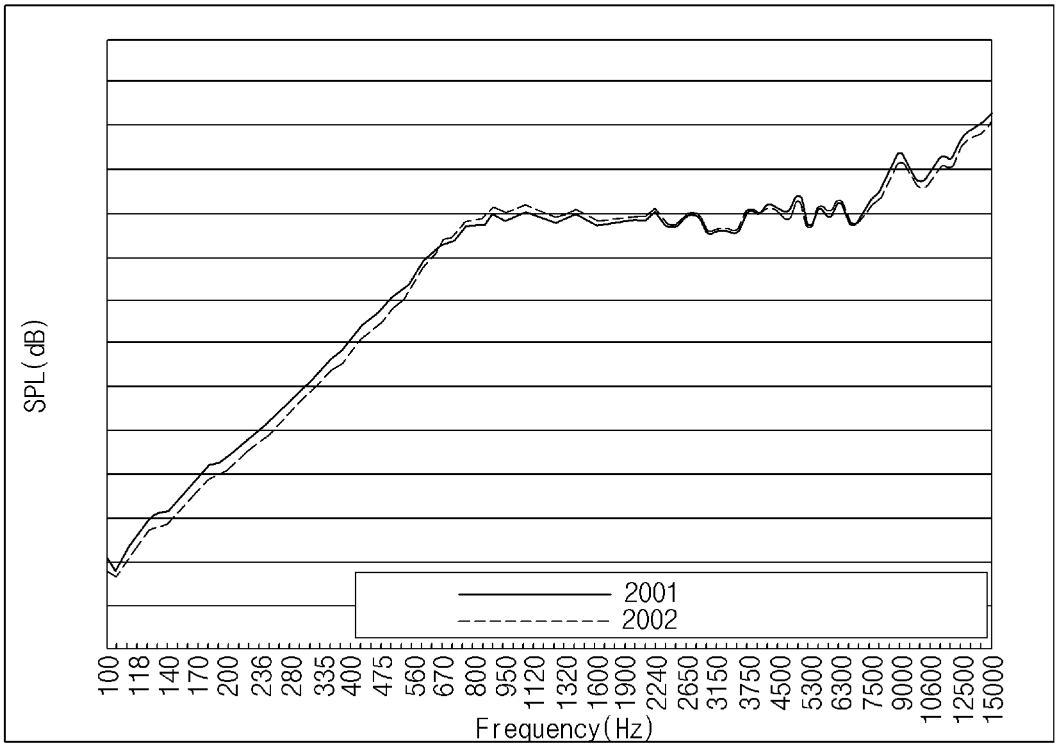
FIG. 20 is a graph depicting a speaker module performance measuring result according to presence of at least one protection structure of an electronic device according to various embodiments.

FIG. 20 is a graph depicting speaker module performance according to presence of at least one protection structure of an electronic device according to various embodiments.

Referring to FIG. 20, line 2001 depicts a sound pressure level (SPL) according to a frequency of an embodiment including the protection structure (e.g., the protection structure 1121 of FIGS. 11A, 11B and 11C, the protection structure 1221 of FIG. 12, the protection structure 1321 of FIGS. 13A and 13B, the protection structure 1421 of FIG. 14, the protection structure 1521 of FIG. 15, the protection structure 1621 of FIGS. 16A, 16B, 16C and 16D, the protection structure 1721 of FIGS. 17A and 17B, and the protection structure 1821 of FIG. 18). Line 2002 depicts a sound pressure level according to a frequency of a comparative example, in which the protection structure is not provided. A performance of the speaker module (e.g., the speaker module 520 of FIG. 5) may be changed according to presence of the protection structure at a corresponding frequency band (e.g., 100 Hz to 15000 Hz). In the comparative example, in which the protection structure is not provided, because the sound absorbing member (e.g., the sound absorbing member 540 of FIG. 5) may be introduced through the motor ventilation hole 700, the motor ventilation hole 700 may be blocked. In this case, the outer space (e.g., the first resonance space 902) of the vibration motor module (e.g., the vibration motor module 510 of FIG. 5) may be blocked from the inner space (e.g., the second resonance space 901) of the vibration motor module, thereby blocking the communicable connection. Accordingly, in the comparative example, because the inner space of the vibration motor module is not included in the entire volume of the resonance space, a performance of the speaker module may be relatively low. According to embodiments, in which the protection structure is provided, because the sound absorbing member is prevented from being introduced into the inner space of the vibration motor module through the motor ventilation hole, by the protection structure, a defect caused as the motor ventilation hole is blocked may be prevented. Through the motor ventilation hole, the first resonance space (that is the outer space of the vibration motor module) and the second resonance space (that is the inner space of the vibration motor module) may be connected to each other. Accordingly, in embodiments, because the entire volume of the resonance space includes both the second resonance space and the first resonance space, a performance of the speaker module may be enhanced. In this way, it may be seen that, in embodiments, in which the inner space of the vibration motor module also is used as the resonance space, the sound pressure of the low frequency band is enhanced as compared with the comparative example as the entire volume of the resonance space increases. It may be seen that a low frequency reproduction ability is enhanced in the embodiment, in which the resonance space is increased, as compared with the comparative example.

According to various embodiments of the disclosure, although the enclosure 401, in which the speaker module (e.g., the speaker module 520 of FIG. 5) and the vibration motor module (e.g., the vibration motor module 510 of FIG. 5) are disposed in the interior thereof, has been mainly described, a component module having the inner space together with the speaker module may be additionally disposed in the enclosure. Because the component module is formed to include a configuration (e.g., the motor ventilation hole (e.g., the motor ventilation hole 700 of FIGS. 7A, 7B and 7C) that is the same as or similar to that of the vibration motor module, the performance of the speaker module and the performance of the component module may be secured.

According to various embodiments of the disclosure, although the protection structure (e.g., the protection structure 1121 of FIGS. 11A, 11B and 11C, the protection structure 1221, the protection structure 1321 of FIGS. 13A and 13B, the protection structure 1421 of FIG. 14, the protection structure 1521 of FIG. 15, the protection structure 1621 of FIGS. 16A, 16B, 16C and 16D, the protection structure 1721 of FIGS. 17A and 17B, the protection structure 1821 of FIG. 18) disposed to face the motor ventilation hole of the vibration motor module has been mainly described, a separate protection structure which is disposed to face the speaker ventilation hole of the speaker module may be additionally provided. The separate protection structure may be configured in a way that is the same as or similar to the protection structure that faces the motor ventilation hole.

In the disclosure, if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

In the disclosure, the expression "configured to" may be interchangeably used with, for example, "suitable for", "capable of", "modified to", "made to", "able to", or "designed to" according to a situation in a hardware or software way. In some situations, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which may perform corresponding operations by executing one or more programs which are stored in a memory device.

The term "module" used in the disclosure may indicate a unit configured in a hardware, software, or firmware way, and for example, may be used interchangeably with the terms such as logic, a logic block, a component, or a circuit. The "module" may be an integral component, or a minimum unit or a part which performs one or more functions. The "module" may be implemented mechanically or electronically, and for example, may include an application-specific integrated circuit (ASIC) chip, field-programmable gate arrays (FPGSs), or a programmable logic device that is known or to be developed in the future, which performs some operations.

At least some of the devices (e.g., modules or functions) or methods (e.g., operations) according to various embodiments of the disclosure may be implemented by an instruction stored in a computer-readable storage medium (e.g., the memory), for example, in the form of a program module. When the instruction is executed by a processor, the processor may perform a function corresponding to the instruction. The computer-readable recording medium may be non-transitory, and may include a hard disk, a floppy disk, a magnetic medium (e.g., a magnetic tape), an optical recording medium (e.g., a CD-ROM or a DVD), an magneto-optical medium (e.g., a floptical disk), and an embedded memory. The instruction may include a code made by a compiler or a code that may be executed by an interpreter.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While aspects of embodiments have been particularly shown and described, it will be understood that various changes in form and details may be made therein without departing from the spirit and scope of the following claims.

What is claimed is:

1. An electronic device comprising:

a housing having a speaker hole formed therein;

a speaker configured to emit a sound signal through the speaker hole;

a vibration motor structure provided adjacent the speaker, and comprising a plurality of side surfaces, wherein a motor ventilation hole is formed through a first side surface of the plurality of side surfaces;

an enclosure provided in the housing, and surrounding at least a portion of the speaker and at least a portion of the vibration motor structure;

a sound absorbing structure provided in the enclosure; and a protection structure provided in the enclosure, and overlapping at least a portion of the motor ventilation hole, wherein the protection structure is positioned to prevent the sound absorbing structure from being introduced through the motor ventilation hole to the vibration motor structure.

2. The electronic device of claim 1, wherein the protection structure is spaced apart from the first side surface by a gap that is smaller than a size of the sound absorbing structure.

3. The electronic device of claim 1, wherein the protection structure is spaced apart from the first side surface by a gap of 0.01 mm to 0.3 mm.

4. The electronic device of claim 1, wherein the enclosure comprises:

a first enclosure; and a second enclosure facing the first enclosure, and wherein the speaker and the vibration motor structure are provided between the first enclosure and the second enclosure.

5. The electronic device of claim 4, wherein the protection structure is integrally formed with the first enclosure, and wherein the protection structure protrudes from the first enclosure toward the second enclosure.

6. The electronic device of claim 4, further comprising a seating structure provided on the first enclosure, and at least partially surrounding the plurality of side surfaces, wherein the protection structure is spaced apart from the seating structure.

7. The electronic device of claim 6, further comprising a plurality of protection structures including the protection structure, wherein the plurality of protection structures are spaced apart from each other by a gap that is smaller than a size of the sound absorbing structure.

8. The electronic device of claim 1, wherein the protection structure has a convexo-concave shape having a concave area and a convex area, and wherein a width of the concave area is less than a shortest dimension of the sound absorbing structure.

9. The electronic device of claim 1, wherein the enclosure comprises:

a first enclosure; and a second enclosure facing the first enclosure, wherein the speaker and the vibration motor structure are provided between the first enclosure and the second enclosure, and wherein the protection structure comprises:

a first portion attached to the first enclosure; and a second portion substantially perpendicular to the first portion, facing the motor ventilation hole, and spaced apart from the motor ventilation hole by a gap that is less than a shortest dimension of the sound absorbing structure.

10. The electronic device of claim 9, wherein the protection structure further comprises a slit overlapping the motor ventilation hole, and wherein a width of the slit is less than the shortest dimension.

11. The electronic device of claim 1, further comprising:

a first circuit board electrically connected to the speaker; and a second circuit board connected to a motor provided in the vibration motor structure and the first circuit board, wherein the second circuit board passes through the motor ventilation hole, and wherein another motor ventilation hole is formed through a second side surface of the plurality of side surfaces.

12. The electronic device of claim 11, wherein the protection structure is integrally formed with the first circuit board, and extends toward the motor ventilation hole.

13. The electronic device of claim 11, wherein the protection structure is provided on the first circuit board within 0.3 mm of the first side surface of the vibration motor structure, and wherein the protection structure comprises any one or any combination of a sponge material, a two-dimensional or three-dimensional mesh material, a rubber material, a stainless steel material, or a plastic material.

14. The electronic device of claim 1, further comprising a plurality of adhesives provided between the enclosure and the vibration motor structure, and spaced apart from each other, wherein an auxiliary motor ventilation hole is formed through a surface of the vibration motor structure which faces the plurality of adhesives, and wherein pipelines provided between the plurality of adhesives connect the auxiliary motor ventilation hole, an outer space of the vibration motor structure, and an inner space of the vibration motor structure.

15. The electronic device of claim 14, wherein each of the plurality of adhesives is narrower than the sound absorbing structure.

16. An electronic device comprising:

a speaker configured to emit a sound signal;

an enclosure surrounding at least a portion of the speaker;

a vibration motor structure provided adjacent the speaker in the enclosure, wherein a motor ventilation hole is formed through the vibration motor structure to connect a first resonance space formed between the vibration motor structure and the enclosure, and a second resonance space formed within the vibration motor structure;

a sound absorbing structure provided in the enclosure; and a protection structure provided in the enclosure, and facing the motor ventilation hole, wherein the protection structure is positioned to prevent the sound absorbing structure from being introduced through the motor ventilation hole to the vibration motor structure.

17. An electronic device comprising:

a speaker configured to emit a sound signal;

an enclosure surrounding at least a portion of the speaker;

a vibration motor structure provided adjacent the speaker in the enclosure, wherein a motor ventilation hole is formed through the vibration motor structure to connect a first resonance space formed between the vibration motor structure and the enclosure, and a second resonance space formed within the vibration motor structure;

a sound absorbing structure provided in the enclosure; and a protection structure provided in the enclosure, and facing the motor ventilation hole, wherein the vibration motor structure comprises a plurality of side surfaces, wherein the motor ventilation hole passes through at least any one of the plurality of side surfaces from an inner side to an outer side thereof, and wherein the protection structure is spaced apart from a side surface of the vibration motor structure, on which the motor ventilation hole is formed, by a gap that is smaller than a size of the sound absorbing structure being interposed therebetween.

18. The electronic device of claim 17, wherein the enclosure comprises a first enclosure and a second enclosure, which face each other, and wherein the protection structure protrudes from the first enclosure toward the second enclosure.

19. The electronic device of claim 17, wherein the enclosure comprises:

a first enclosure and a second enclosure, which face each other, wherein the protection structure is attached to the first enclosure, and wherein the protection structure comprises any one or any combination of a sponge material, a two-dimensional or three-dimensional mesh material, a rubber material, a stainless steel material, or a plastic material.

20. The electronic device of claim 17, further comprising:

a first circuit board electrically connected to the speaker; and a second circuit board connected to a motor provided in the vibration motor structure and the first circuit board, wherein the protection structure is integrally formed with the first circuit board or is provided on the first circuit board.

* * * * *